US009827850B2

(12) United States Patent
Hamad et al.

(10) Patent No.: US 9,827,850 B2
(45) Date of Patent: Nov. 28, 2017

(54) ADJUSTING A FUEL ON-BOARD A VEHICLE

(71) Applicant: Saudi Arabian Oil Company, Dhahran (SA)

(72) Inventors: Esam Z. Hamad, Dhahran (SA); Abdullah Sadek AlRamadan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 56 days.

(21) Appl. No.: 15/084,844

(22) Filed: Mar. 30, 2016

(65) Prior Publication Data

US 2017/0282708 A1 Oct. 5, 2017

(51) Int. Cl.
*F02M 37/00* (2006.01)
*F02D 19/06* (2006.01)
(Continued)

(52) U.S. Cl.
CPC ............. *B60K 15/063* (2013.01); *B01D 3/06* (2013.01); *B01D 11/0484* (2013.01); *B01D 11/0492* (2013.01); *C10L 1/02* (2013.01); *C10L 10/10* (2013.01); *C10L 10/12* (2013.01); *F02D 19/0663* (2013.01); *F02D 19/0665* (2013.01);
(Continued)

(58) Field of Classification Search
CPC .......... B60K 15/03; B60K 2015/03118; B60K 2015/03131; B60K 2015/03151; B01D 3/06; B01D 3/40; B01D 3/42; B01D 11/04; B01D 11/0484; B01D 11/0488; B01D 11/0492; C10G 21/16; C10G 21/00; C10G 21/06; C10G 21/27; C10G 21/28; F02D 19/06; F02D 19/0663; F02D 19/0665; F02D 19/0671; F02D 19/0673; F02D 19/0676; F02M 25/022; F02M 25/10; F02M 25/12; F02M 37/0064
See application file for complete search history.

(56) References Cited

U.S. PATENT DOCUMENTS 2,909,577 A 10/1959 Clingman, Jr.
3,242,222 A 3/1966 Ryan
(Continued)

OTHER PUBLICATIONS

International Search Report and Written Opinion of the International Searching Authority issued in International Application No. PCT/US2017/017214 dated May 24, 2017; 14 pages.

*Primary Examiner* — Katherine Zalasky
(74) *Attorney, Agent, or Firm* — Fish & Richardson P.C.

(57) ABSTRACT

Techniques for separating a fuel on-board a vehicle include mixing an input fuel stream and a fluid solvent; separating the mixture into a first liquid fuel stream and a second liquid fuel stream, the first liquid fuel stream including a first portion of the input fuel stream defined by a first auto-ignition characteristic value and the fluid solvent, the second liquid fuel stream including a second portion of the input fuel stream defined by a second auto-ignition characteristic value that is different than the first auto-ignition characteristic value; separating the first liquid fuel stream into the fluid solvent and the first portion of the input fuel stream; directing the first portion of the input fuel stream to a first fuel tank on the vehicle; and directing the second portion of the input fuel stream to a second fuel tank on the vehicle.

24 Claims, 8 Drawing Sheets

(51) Int. Cl.
| | |
|---|---|
| *F02D 19/08* | (2006.01) |
| *F02D 19/12* | (2006.01) |
| *B01D 11/04* | (2006.01) |
| *B01D 3/06* | (2006.01) |
| *C10L 1/02* | (2006.01) |
| *C10L 10/10* | (2006.01) |
| *C10L 10/12* | (2006.01) |
| *B60K 15/063* | (2006.01) |
| *B60K 15/03* | (2006.01) |
| *B01D 11/00* | (2006.01) |
| *C10G 21/16* | (2006.01) |
| *C10G 21/28* | (2006.01) |
| *C10G 21/27* | (2006.01) |
| *F02M 25/10* | (2006.01) |

(52) U.S. Cl.
CPC ..... *F02D 19/0671* (2013.01); *F02M 37/0064* (2013.01); *B01D 2011/002* (2013.01); *B60K 2015/03236* (2013.01); *C10G 21/16* (2013.01); *C10G 21/27* (2013.01); *C10G 21/28* (2013.01); *C10L 2290/24* (2013.01); *C10L 2290/543* (2013.01); *F02M 25/10* (2013.01)

(56) References Cited

U.S. PATENT DOCUMENTS

| | | | |
|---|---|---|---|
| 4,594,144 A | 6/1986 | James, Jr. et al. | |
| 5,328,596 A * | 7/1994 | Gammie, II | B01D 3/06 208/311 |
| 6,119,637 A * | 9/2000 | Matthews | F02M 1/165 123/179.8 |
| 6,494,192 B1 * | 12/2002 | Capshaw | F02M 37/20 123/179.16 |
| 6,972,093 B2 * | 12/2005 | Partridge | C10G 31/11 123/1 A |
| 7,661,414 B2 * | 2/2010 | Kamio | F02M 25/0224 123/3 |
| 8,015,951 B2 | 9/2011 | Dearth et al. | |
| 8,028,683 B1 * | 10/2011 | Forrest | F02D 41/0025 123/543 |
| 8,211,300 B2 | 7/2012 | Partridge et al. | |
| 8,580,111 B2 | 11/2013 | Partridge et al. | |
| 8,656,869 B2 | 2/2014 | Leone et al. | |
| 2002/0152999 A1 | 10/2002 | Holder et al. | |
| 2007/0028861 A1 | 2/2007 | Kamio | |
| 2007/0170097 A1 | 7/2007 | Lourent | |
| 2007/0215072 A1 | 9/2007 | Dearth et al. | |
| 2010/0077746 A1 * | 4/2010 | Gray, Jr. | F01K 7/16 60/604 |
| 2015/0052876 A1 | 2/2015 | Leone | |

\* cited by examiner

ADJUSTING A FUEL ON-BOARD A VEHICLE

TECHNICAL FIELD

This disclosure relates to adjusting a fuel on-board a vehicle and, more particularly, dynamically separating a fuel on-board a vehicle according to at least one characteristic of the fuel.

BACKGROUND

Vehicles, such as cars, trucks, boats, all-terrain vehicles, and otherwise, typical use internal combustion engines for power. These engines require fuel, such as gasoline, diesel, or otherwise, to operate. The fuel is often characterized by an octane or cetane number.

SUMMARY

In a general implementation, a method for separating a fuel on-board a vehicle includes mixing, in an on-board fuel separation assembly of a vehicle, an input fuel stream and a fluid solvent; separating the mixture of the input fuel stream and the fluid solvent into a first liquid fuel stream and a second liquid fuel stream, the first liquid fuel stream including a first portion of the input fuel stream defined by a first auto-ignition characteristic value and the fluid solvent, the second liquid fuel stream including a second portion of the input fuel stream defined by a second auto-ignition characteristic value that is different than the first auto-ignition characteristic value; separating the first liquid fuel stream into the fluid solvent and the first portion of the input fuel stream; directing the first portion of the input fuel stream to a first fuel tank on the vehicle; and directing the second portion of the input fuel stream to a second fuel tank on the vehicle.

In a first aspect combinable with the general implementation, the input fuel stream includes at least one of an aromatics portion or an oxygenates portion.

In another aspect combinable with any of the previous aspects, separating the mixture of the input fuel stream and the fluid solvent into the first liquid fuel stream and the second liquid fuel stream includes separating the first portion of the input fuel stream and the fluid solvent into the first liquid fuel stream based on a degree of affinity between at least one of the aromatics portion or the oxygenates portion and the fluid solvent.

In another aspect combinable with any of the previous aspects, the fluid solvent includes a first solvent portion including at least one of: dimethyl sulfoxide, sulfolane, propylene carbonate, ethylene glycol, diethylene glycol, triethylene glycol, tetraethylene glycol, N-formylmorpholine, furan, tetrahydrofuran, pyrrolidine, pyrrole, or thiophene.

In another aspect combinable with any of the previous aspects, the fluid solvent includes a second solvent portion including at least one of: amyl acetate, benzyl alcohol, methyl isobutyl ketone, or water.

In another aspect combinable with any of the previous aspects, separating the mixture of the input fuel stream and the fluid solvent into the first liquid fuel stream includes separating the aromatics portion of the input fuel stream into the first liquid fuel stream with the first solvent portion.

In another aspect combinable with any of the previous aspects, separating the mixture of the input fuel stream and the fluid solvent into the first liquid fuel stream includes separating the oxygenates portion of the input fuel stream into the first liquid fuel stream with the second solvent portion.

In another aspect combinable with any of the previous aspects, mixing the input fuel stream and the fluid solvent includes mixing the input fuel stream and the fluid solvent in a liquid-liquid extractor of the on-board fuel separation assembly.

In another aspect combinable with any of the previous aspects, separating the mixture of the input fuel stream and the fluid solvent into the first liquid fuel stream and the second liquid fuel stream includes separating the mixture of the input fuel stream and the fluid solvent into the first liquid fuel stream and the second liquid fuel stream in the liquid-liquid extractor.

In another aspect combinable with any of the previous aspects, separating the fluid solvent from the first liquid fuel stream includes separating the fluid solvent from the first liquid fuel stream based on a difference in respective boiling points of the fluid solvent and the first liquid fuel stream.

In another aspect combinable with any of the previous aspects, separating the fluid solvent from the first liquid fuel stream based on the difference in respective boiling points of the fluid solvent and the first liquid fuel stream includes separating the fluid solvent from the first liquid fuel stream in a flash tank or a distillation unit of the on-board fuel assembly.

Another aspect combinable with any of the previous aspects further includes directing the first liquid fuel stream and the first portion of the input fuel stream through a first heat exchanger of the on-board fuel separation assembly; heating the first liquid fuel stream in the first heat exchanger with heat from the first portion of the input fuel stream; and directing the heated first liquid fuel stream to be separated into the fluid solvent and the first portion of the input fuel stream.

Another aspect combinable with any of the previous aspects further includes directing the heated first liquid fuel stream through a second heat exchanger of the on-board fuel separation assembly; heating the heated first liquid fuel stream in the second heat exchanger with heat from an engine exhaust stream.

Another aspect combinable with any of the previous aspects further includes directing the heated first liquid fuel stream to be separated into the fluid solvent and the first portion of the input fuel stream.

Another aspect combinable with any of the previous aspects further includes directing the heated first liquid fuel stream through a third heat exchanger of the on-board fuel separation assembly; and heating the heated first liquid fuel stream in the third heat exchanger with heat from a flow of the fluid solvent separated from the first portion of the input fuel stream.

Another aspect combinable with any of the previous aspects further includes determining a flow rate of the fluid solvent separated from the first liquid fuel stream; determining a decrease in the flow rate of the separated fluid solvent; and based on the determined decrease being greater than a threshold value, directing fluid solvent from an on-board fluid solvent storage tank.

In another aspect combinable with any of the previous aspects, the first auto-ignition characteristic value includes a first octane number (ON) or a first cetane number, and the second auto-ignition characteristic value includes a second ON or a second cetane number.

In another general implementation, an on-board fuel separation system includes a liquid-liquid extraction unit configured to separate a mixture of an input fuel stream and a fluid solvent into a first liquid fuel stream and a second liquid fuel stream, the first liquid fuel stream including a first portion of the input fuel stream defined by a first auto-ignition characteristic value and the fluid solvent, the second liquid fuel stream including a second portion of the input fuel stream defined by a second auto-ignition characteristic value that is different than the first auto-ignition characteristic value; a separator fluidly coupled to the liquid-liquid extraction unit and configured to receive the first liquid fuel stream and separate the first liquid fuel stream into the fluid solvent and the first portion of the input fuel stream; a first fuel tank fluidly coupled to receive the first portion of the input fuel stream from the separator; and a second fuel tank fluidly coupled to receive the second portion of the input fuel stream from the liquid-liquid extraction unit.

In a first aspect combinable with the general implementation, the input fuel stream includes at least one of an aromatics portion or an oxygenates portion.

In another aspect combinable with any of the previous aspects, the fluid solvent includes a first solvent portion including at least one of: dimethyl sulfoxide, sulfolane, propylene carbonate, ethylene glycol, diethylene glycol, triethylene glycol, tetraethylene glycol, N-formylmorpholine, furan, tetrahydrofuran, pyrrolidine, pyrrole, or thiophene.

In another aspect combinable with any of the previous aspects, the liquid-liquid-extraction unit is further configured to separate the aromatics portion of the input fuel stream into the first liquid fuel stream with the first solvent portion.

In another aspect combinable with any of the previous aspects, the fluid solvent includes a second solvent portion including at least one of: amyl acetate, benzyl alcohol, methyl isobutyl ketone, or water.

In another aspect combinable with any of the previous aspects, the liquid-liquid-extraction unit is further configured to separate the oxygenates portion of the input fuel stream into the first liquid fuel stream with the second solvent portion.

In another aspect combinable with any of the previous aspects, the liquid-liquid extraction unit is configured to separate the first portion of the input fuel stream and the fluid solvent into the first liquid fuel stream based on a degree of affinity between at least one of the aromatics portion or the oxygenates portion and the fluid solvent.

In another aspect combinable with any of the previous aspects, the separator includes a flash tank or a distillation unit configured to separate the fluid solvent from the first liquid fuel stream based on a difference in respective boiling points of the fluid solvent and the first liquid fuel stream.

Another aspect combinable with any of the previous aspects further includes a first heat exchanger positioned to receive the first liquid fuel stream from the liquid-liquid extraction unit and heat the first liquid fuel stream with the first portion of the input fuel stream from the separator.

Another aspect combinable with any of the previous aspects further includes a second heat-exchanger positioned to receive first liquid fuel stream from the first heat exchanger and heat the first liquid fuel stream with an engine exhaust stream.

Another aspect combinable with any of the previous aspects further includes a third heat exchanger positioned to receive the first liquid fuel stream from the second heat exchanger and heat the first liquid fuel stream with the fluid solvent from the separator.

In another aspect combinable with any of the previous aspects, the first auto-ignition characteristic value includes a first octane number (ON) or a first cetane number, and the second auto-ignition characteristic value includes a second ON or a second cetane number.

In another general implementation, a vehicle system includes a vehicle; a fuel-powered internal combustion engine mounted in the vehicle; and an on-board fuel separation system. The on-board fuel separation system include a liquid-liquid extraction unit configured to separate a mixture of an input fuel stream and a fluid solvent into a first liquid fuel stream and a second liquid fuel stream, the first liquid fuel stream including a first portion of the input fuel stream defined by a first auto-ignition characteristic value and the fluid solvent, the second liquid fuel stream including a second portion of the input fuel stream defined by a second auto-ignition characteristic value that is different than the first auto-ignition characteristic value; and a separator fluidly coupled to the liquid-liquid extraction unit and configured to receive the first liquid fuel stream and separate the first liquid fuel stream into the fluid solvent and the first portion of the input fuel stream. The vehicle system further includes a first fuel tank fluidly coupled between the engine and the separator to store the first portion of the input fuel stream from the separator; and a second fuel tank fluidly coupled between the engine and the liquid-liquid extraction unit to store the second portion of the input fuel stream from the liquid-liquid extraction unit.

In a first aspect combinable with the general implementation, the input fuel stream includes at least one of an aromatics portion or an oxygenates portion.

In another aspect combinable with any of the previous aspects, the fluid solvent includes a first solvent portion including at least one of: dimethyl sulfoxide, sulfolane, propylene carbonate, ethylene glycol, diethylene glycol, triethylene glycol, tetraethylene glycol, N-formylmorpholine, furan, tetrahydrofuran, pyrrolidine, pyrrole, or thiophene.

In another aspect combinable with any of the previous aspects, the liquid-liquid-extraction unit is further configured to separate the aromatics portion of the input fuel stream into the first liquid fuel stream with the first solvent portion.

In another aspect combinable with any of the previous aspects, the fluid solvent includes a second solvent portion including at least one of: amyl acetate, benzyl alcohol, methyl isobutyl ketone, or water.

In another aspect combinable with any of the previous aspects, the liquid-liquid-extraction unit is further configured to separate the oxygenates portion of the input fuel stream into the first liquid fuel stream with the second solvent portion.

In another aspect combinable with any of the previous aspects, the liquid-liquid extraction unit is configured to separate the first portion of the input fuel stream and the fluid solvent into the first liquid fuel stream based on a degree of affinity between at least one of the aromatics portion or the oxygenates portion and the fluid solvent.

In another aspect combinable with any of the previous aspects, the separator includes a flash tank or a distillation unit configured to separate the fluid solvent from the first liquid fuel stream based on a difference in respective boiling points of the fluid solvent and the first liquid fuel stream.

Another aspect combinable with any of the previous aspects further includes a first heat exchanger positioned to receive the first liquid fuel stream from the liquid-liquid extraction unit and heat the first liquid fuel stream with the first portion of the input fuel stream from the separator.

Another aspect combinable with any of the previous aspects further includes a second heat-exchanger positioned to receive the separated fluid solvent from the first heat exchanger and heat the first liquid fuel stream with an engine exhaust stream.

Another aspect combinable with any of the previous aspects further includes a third heat exchanger positioned to receive the first liquid fuel stream from the second heat exchanger and heat the first liquid fuel stream with the fluid solvent from the separator.

Another aspect combinable with any of the previous aspects further includes a make-up solvent system, including a make-up solvent tank configured to store a volume of the fluid solvent, the make-up solvent tank fluidly coupled to the liquid-liquid extraction unit; and a control system communicably coupled to a fluid solvent regulator to control a circulation of the fluid solvent from the make-up solvent tank to the liquid-liquid extraction unit.

In another aspect combinable with any of the previous aspects, the control system is configured to perform operations, including determining that a flow rate of the fluid solvent output from the separator is less than a threshold value; and based on the determination, controlling the fluid solvent regulator to circulate fluid solvent from the make-up solvent tank to the liquid-liquid extraction unit.

In another aspect combinable with any of the previous aspects, the first auto-ignition characteristic value includes a first octane number (ON) or a first cetane number, and the second auto-ignition characteristic value includes a second ON or a second cetane number.

Implementations according to the present disclosure may include one or more of the following features. For example, implementations can reduce fuel consumption, fuel cost, as well as $CO_2$ emissions from vehicles. As another example, fuel consumption of a vehicle may be reduced by supplying the engine of the vehicle with a fuel that has an optimized auto-ignition characteristic value (for example, octane, cetane, or otherwise), rather than a higher volumetric flow rate of fuel. For instance, implementations may supply the engine with a fuel of a particular optimized auto-ignition characteristic value based on engine load or operating conditions. Such implementations may optimize the auto-ignition characteristic value of a single source of fuel stored on the vehicle (for example, in a fuel tank). Additionally, implementations described herein may optimize the auto-ignition characteristic value of fuel on-board the vehicle. As another example, implementations disclosed herein may provide for multiple fuel streams, each with different auto-ignition characteristic values, from a single fuel source stored on an operating vehicle. As yet another example, implementations may allow a vehicle driver to purchase a fuel with a low auto-ignition characteristic value (for example, low octane number), which is typically more cost-efficient, while still allowing the vehicle to use both the purchased fuel and a separated, higher value, fuel.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes a fuel separation system that may be mounted on-board a vehicle, such as a car, truck, boat, or other vehicle that utilizes an engine to generate motive power. In some aspects, the fuel separation system separates an input fuel stream into two or more fractional fuel streams based on an affinity of particular components of the input fuel stream to a solvent (for example, a liquid solvent) introduced into the separation unit. The separated fractional fuel components are each defined by a particular auto-ignition characteristic value, such as, for example, octane number, or "ON" (for example, research octane number (RON) or motor octane number (MON)), cetane number, or otherwise. The auto-ignition characteristic values of the separated fractional fuel components may vary, thus resulting in a fractional fuel component stream that has a lower value than another fractional fuel component stream from the fuel separator. One or more of the fractional fuel components that are output from the separator may also include the solvent, which may then be separated from the fractional fuel component(s) to result in multiple fuel streams each having a different auto-ignition characteristic value. In some aspects, an operating condition of the separator, or type or chemistry of the solvent, or other additional components of the on-board fuel separation system, may be controlled to result in particular auto-ignition characteristic values of the multiple fuel streams.

Figure 1:
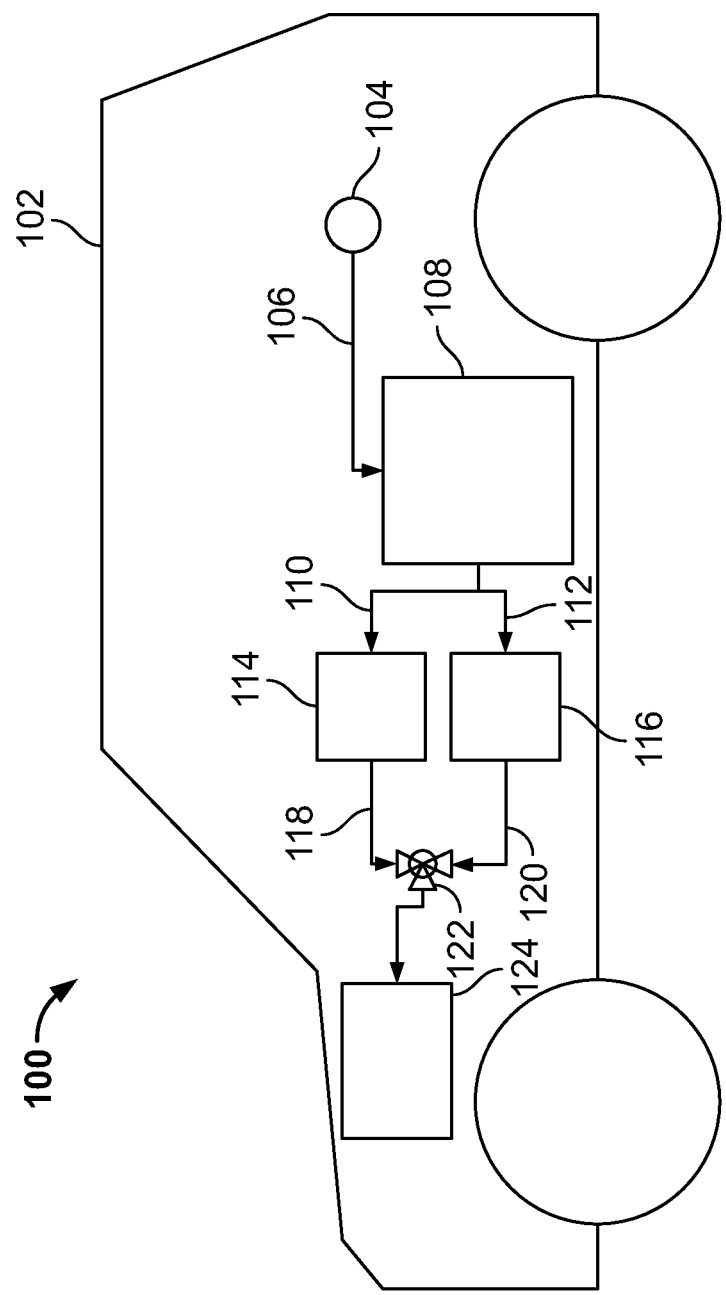
FIG. 1 is a schematic illustration of a multi-fuel vehicle system that includes an example implementation of an on-board fuel separation system according to the present disclosure.

FIG. 1 is a schematic illustration of a vehicle system 100 that includes an example implementation of an on-board fuel separation system 108 according to the present disclosure. As illustrated in FIG. 1, the vehicle system 100 includes a vehicle 100, which is represented as an automobile, but the present disclosure contemplates that a "vehicle" can include an automobile, motorized cycle, all-terrain vehicle (ATV), nautical vehicle (for example, boat or otherwise), or an airborne vehicle (for example, plane, ultralight, drone, or otherwise), whether manned or unmanned. Indeed, the present disclosure contemplates that a "vehicle" is any apparatus that derives powered movement from a hydrocarbon liquid fuel, such as gasoline, naphtha, or diesel as examples. A "vehicle" may also be any apparatus that includes an engine designed to use a fuel having an auto-ignition characteristic value, such as RON or MON (for example, in the case of gasoline fuels) or cetane number (for example, in the case of diesel fuels).

The illustrated vehicle 102 includes a fuel input 104 that is fluidly coupled to the on-board fuel separation system 108 to provide a fuel stream 106 to the separation system 108, for example, during operation of the vehicle 102. In some aspects, a fuel tank (not shown) is fluidly coupled in between the fuel input 104 and the on-board fuel separation system 108, for example, to contain a particular volume of fuel stream 106. In such aspects, the fuel stream 106 may be variably circulated (for example, pumped) from the fuel tank to the on-board fuel separation system 108, for example, as necessary for operation of the vehicle 102. In some aspects, a fuel rail of the vehicle could also be used for circulation of the fuel stream 106.

As described herein, the on-board fuel separation system 108 separates the fuel stream 106 into two or more individual fraction streams based on, for example, a particular characteristic of the fuel stream 106. For example, the fuel stream 106 may be separated into fractions based on an affinity for a particular fluid solvent (or solvents) for which the fractions within the fuel stream 106 have. The fuel stream 106, in some aspects, may be separated into an aromatic or oxygenate fraction as well as other compound fractions. In some aspects, the on-board fuel separation system 108 may include, as described below, one or more liquid-liquid extraction units and one or more separators, such as flash distillation separators (for example, flash tanks or compact distillation units or otherwise), that separate the fuel stream 106 and recover the fluid solvent(s) based on the affinity of the fractions for the fluid solvent(s), with each fraction having distinct auto-ignition characteristic values (for example, ON, cetane number, or otherwise).

The illustrated vehicle 102 includes two or more fuel fraction conduits shown as 110 and 112, which fluidly couple the on-board fuel separation system 108 to fractional fuel tanks 114 and 116. For example, the fuel fraction conduit 110 may fluidly couple the on-board fuel separation system 108 to the fractional fuel tank 114 to store a fuel fraction output by the on-board fuel separation system 108 that has a particular auto-ignition characteristic value, while the fuel fraction conduit 112 may fluidly couple the on-board fuel separation system 108 to the fractional fuel tank 116 to store another fuel fraction output by the on-board fuel separation system 108 that has a different auto-ignition characteristic value. In particular implementations, the fractional fuel tank 114 may store a fuel fraction output by the on-board fuel separation system 108 that has a higher ON relative to a fuel fraction output by the on-board fuel separation system 108 that is stored in the fractional fuel tank 116. Although only two fractional fuel tanks are shown, the present disclosure contemplates that more than two fractional fuel tanks may be fluidly coupled to the on-board fuel separation system 108 (for example, depending on the number of separation stages of the on-board fuel separation system 108).

In some aspects, the two fuel streams 118 and 120 may each be fed directly to the engine 124. For example, one fuel stream (of fuel streams 118 and 120) could by port-injected and the other fuel stream (of fuel streams 118 and 120) could be directly injected into the cylinders of the engine 124. This implementation may avoid any time lag in providing the correct fuel to the engine 124, as a time lag could result from the fuel already in the fuel line after valve 122. In some aspects, the fuel route for the fuel streams 118 and 120 is kept as short as possible.

In this example schematic illustration, the fractional fuel tanks 114 and 116 are fluidly coupled to an engine 124 (for example, internal combustion gasoline, naphtha, or diesel engine) through fractional fuel supply lines 118 and 120 and a control valve 122. For example, the fractional fuel tank 114 (for example, which stores a higher ON fuel fraction) is fluidly coupled to the engine 124 through the supply line 118, while the fractional fuel tank 116 (for example, which stores a lower ON fuel fraction) is fluidly coupled to the engine 124 through the supply line 120. Based on, for example, dynamic (for example, instantaneous or real-time) driving conditions, such as speed vs. torque conditions, the control valve 122 may be controlled (for example, by a vehicle control system, not shown) to supply a particular fuel fraction stored in one of the fractional fuel tanks 114/116 to the engine 124. The supplied fuel fraction may have an auto-ignition characteristic value (for example, ON or cetane number) optimized for the dynamic (for example, instantaneous or real-time) driving conditions. For example, a higher ON fuel fraction (for example, stored in tank 114) may be circulated to the engine 124 based on high load engine conditions, high speed engine conditions, or a combination thereof. A lower ON fuel fraction (for example, stored in tank 116) may be circulated to the engine 124 based on low load engine conditions, low speed engine conditions, or a combination thereof.

In some aspects, the on-board fuel separation system 108 may help reduce fuel consumption, cost and $CO_2$ emissions. For example, depending on engine operating requirements (for example, dynamic or in real-time), a fuel fraction that has minimum required auto-ignition characteristic value (for example, ON) is supplied to the engine 124 (and not more as is conventional). Therefore, the on-board fuel separation system 108 may store a relatively high ON fuel fraction (for example, in fractional fuel tank 114) for the high load and high speed operating conditions. Similarly, a relatively low ON fuel fraction is stored (for example, in fractional fuel tank 116) for low load and low speed operating conditions.

In some aspects, the fractional fuel tanks 114 and 116 may be eliminated from the system 100, and, thus, one of the fuel fractions (for example, a higher ON fraction or lower ON fraction) may be circulated in real-time (for example, during operation of the engine 124 to power the vehicle 102) from the on-board fuel separation system 108 to the engine 124 as dictated by the engine operating conditions (for example, speed vs. torque, engine map operating point, or otherwise). Thus, in some aspects, the only fuel storage tank on the vehicle 102 may be fluidly coupled between the fuel input 104 and the on-board fuel separation system 108 (for example, a standard vehicle fuel tank). Therefore, in some aspects, the on-board fuel separation system 108 may be integrated into a conventional vehicle 102 that includes a single fuel tank.

Figure 2:
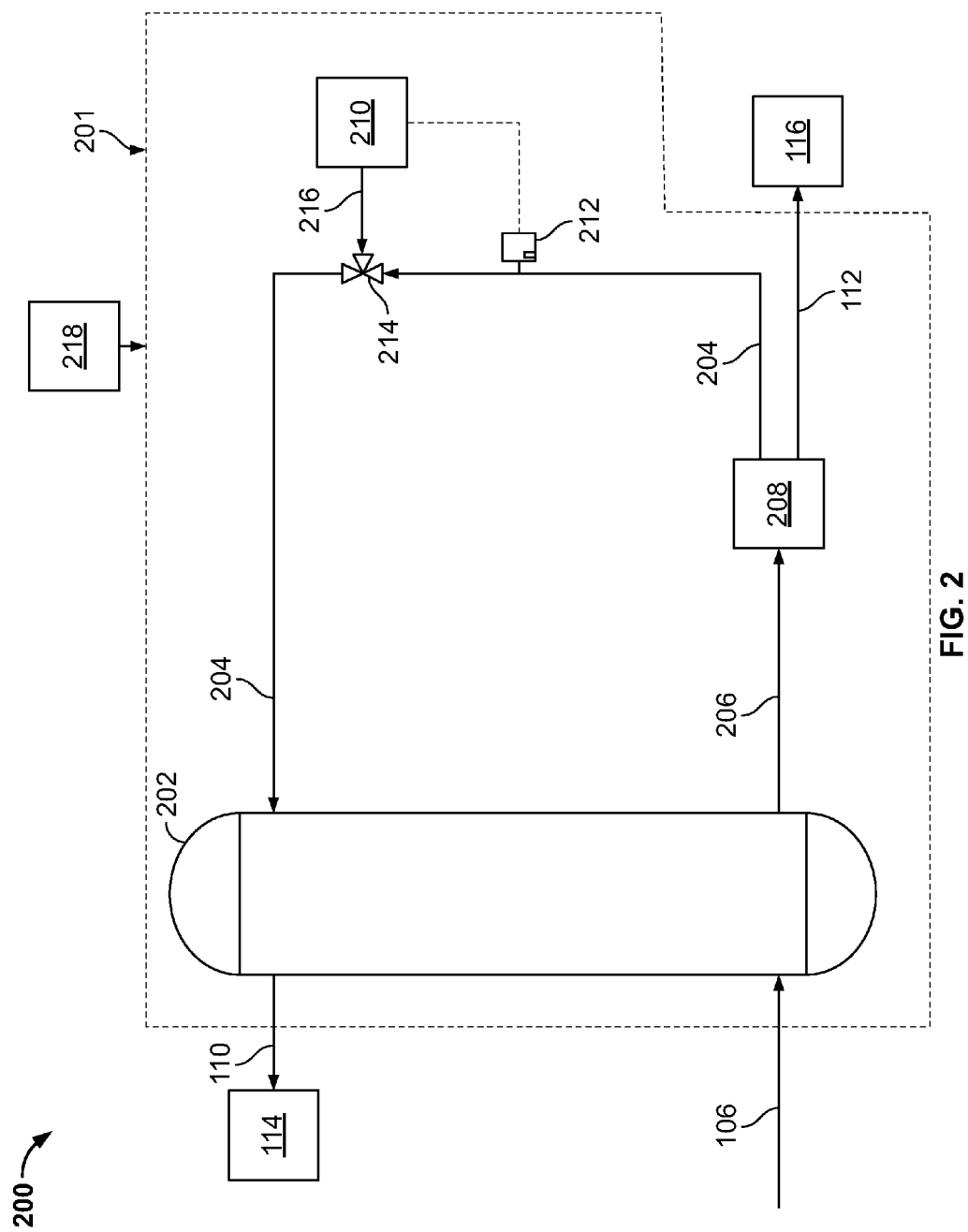
FIG. 2 is a schematic illustration of an example implementation of an on-board fuel separation system according to the present disclosure.

FIG. 2 is a schematic illustration of an example implementation of an on-board fuel separation system 200 according to the present disclosure. In some aspects, at least a portion of the system 200 may be implemented as the on-board fuel separation system 108 in the vehicle 102 shown in FIG. 1. The illustrated on-board fuel separation system 200 includes an on-board fuel separation sub-assembly 201 (designated by the dashed line) that includes several components. In alternative example implementations, more or fewer of the illustrated components may be included in the on-board fuel separation sub-assembly 201.

As illustrated, the fuel stream 106 may be received at an extraction unit 202. The extraction unit 202 also receives an input of a fluid solvent stream 204. In some aspects, both of the fuel stream 106 and fluid solvent stream 204 are input to the extraction unit 202 in liquid form, and the extraction unit 202 is a liquid-liquid extraction unit 202. The liquid-liquid extraction unit 202 may include or have a certain shape with a maximum contact area between the fuel stream 106 and the fluid solvent stream 204 for better effectiveness of separation. The liquid-liquid extraction unit 202 may include one or more (equilibrium) stages.

The fluid solvent stream 204 includes one or more fluid solvents to which components of the input fuel stream 106 have an affinity. For example, in some aspects, the fluid solvent stream 204 may include a fluid solvent to which aromatics of the input fuel stream 106 have an affinity. Example solvents include dimethyl sulfoxide, sulfolane, propylene carbonates, ethylene glycol, diethylene glycol, triethylene glycol, tetraethylene glycol, N-formylmorpholine, furan, tetrahydrofuran, pyrrolidine, pyrrole, thiophene, some ionic liquids and other solvents that can be used in the extraction unit 202 to separate aromatics of the input fuel stream 106 from other fuel components of the stream 106. As another example, in some aspects, the fluid solvent stream 204 may include a fluid solvent to which oxygenates of the input fuel stream 106 have an affinity. Example solvents include amyl acetate, benzyl alcohol, methyl isobutyl ketone, water, certain ionic liquids, and other solvents that can be used in the extraction unit 202 to separate oxygenates in the input fuel stream 106 from other components of the stream 106. For example, molecules within the solvent stream 204 and stream 106 interact with intermolecular potentials that have positive and negative parts. Affinity occurs when attractive interactions dominate between some solute(s) and the fluid solvent stream 204. For example, a hydrogen bond between the hydroxyl group (—OH) in an alcohol oxygenate will form with a properly selected solvent, leading to affinity.

For separating both aromatics and oxygenates from the fuel stream 106, solvents common to both, or a mixture of solvents, can be used in the fluid solvent stream 204. In some aspects, traces of the solvents used may be circulated to an engine (for example, engine 124) and combust with the fuel input to the engine (for example, one of fuel stream 118 or 120). Oxygen containing solvents, such as glycols, could provide positive effects such as an increase in octane number for gasoline engines, or an increase in lubricity for diesel engines. In contrast, solvents with sulfur or nitrogen atoms, such as sulflolane and N-formylmorpholine, may increase SOx or NOx emissions in combustion of these solvents.

As illustrated in this example, two liquid streams are output from the extraction unit 202. A mixed solvent-extract stream 206 is output from the extraction unit 202 and includes a mixture of the fluid solvent stream 204 and a first fractional component of the input fuel stream 106 (in other words, the extract). The first fractional component of the input fuel stream 106 may include, for example, a portion of the fuel stream that is defined by a particular auto-ignition characteristic value (for example, ON or cetane number). Also output from the extraction unit 202 is a second fractional component of the input fuel stream 106, which is carried to the fractional fuel tank 114 in fractional fuel conduit 110. The second fractional component (in other words, the raffinate) of the input fuel stream 106, therefore, is separated from the remaining input fuel stream 106, which is mixed with the solvent in the solvent-extract stream 206. Like the first fractional component (extract), the second fractional component (raffinate) may be defined by another particular auto-ignition characteristic value (for example, ON or cetane number). The raffinate, therefore, may be stored in the fractional fuel tank 114 for use by the engine.

In examples where the auto-ignition characteristic value is ON, for instance, the extract and the raffinate may have different RONs, depending on a variety of factors. For example, a volumetric ratio of the fluid solvent stream 204 to the input fuel stream 106 may determine, at least in part, a difference in RONs between the extract and raffinate output from the extraction unit 202. As another example, operating characteristics of one or more of the components of the on-board fuel separation sub-assembly 201 may vary a difference in RONs of the extract and raffinate.

As illustrated in FIG. 2, the solvent-extract stream 206 is circulated to a separator 208. The separator 208 separates the solvent and the extract and outputs a fluid solvent stream 204 and an extract stream that is circulated in the fractional fuel conduit 112 to the fractional fuel tank 116. In some examples, the separator 208 is a flash tank or distillation unit that separates the solvent and the extract based on a difference in boiling points of the solvent and extract. For example, a solvent with high boiling point may be separated from an extract with a low boiling point (for example, in fuel streams 106 of gasoline or naphtha). For a high boiling point fuel stream 106, such as diesel and middle distillates, a solvent with a low boiling point may be used to ensure complete or almost complete separation of the extract and solvent in the separator 208. The separated extract may be stored in the fractional fuel tank 116 for use by the engine, thereby providing the engine with at least two different fuel sources: a fuel source stored in fractional fuel tank 114 with a particular auto-ignition characteristic value, and a fuel source stored in fractional fuel tank 116 with a different, particular auto-ignition characteristic value.

In some aspects, an amount of solvent may remain with the raffinate and circulate through the fractional fuel conduit 110. In such aspects, another separator (for example, similar to separator 208) may be positioned between the extraction unit 202 and the fractional fuel tank 114 to recover the fluid solvent from the raffinate.

The fluid solvent stream 204 is recirculated from the separator 208 to the extraction unit 202. In this example implementation, a solvent make-up system is fluidly coupled to the separator 208 and the extraction unit 202. In this example, the solvent make-up system includes a solvent make-up tank 210 that is fluidly coupled to a solvent regulator 214 (for example, a control valve, variable orifice, or other controllable liquid regulator), and a flow meter 212. In this example, the flow meter 212 may measure or estimate a flow rate of the fluid solvent stream 204 from the separator 208 and provide the flow rate information to the make-up tank 216 (for example, in the case of a flow switch), the solvent regulator 214, a control system 218 that is communicably coupled to the on-board fuel separation sub-assembly 201, or a combination thereof. If the flow rate of the fluid solvent stream 204 drops below a predetermined value (for example, if some of the fluid solvent does not separate from the extract in the separator 208, or is circulated to the fractional fuel tank 114 with the raffinate), then fluid solvent 216 from the make-up tank 210 may be circulated through the solvent regulator 214 to combine with the fluid solvent stream 204.

As illustrated, the on-board fuel separation system 200 includes a control system 218 that is communicably coupled to the on-board fuel separation sub-assembly 201 to control one or more components of the sub-assembly 201 (for example, the extraction unit 202, the separator 208, the solvent make-up system or other components (for example, valves, pumps, and other components, not shown). In some aspects, the control system 218 may be a mechanical, pneumatic, electro-mechanical, or micro-processor based control system (or a combination thereof). The control system 218 may receive (or store) inputs associated with engine operating characteristics of an engine of a vehicle that includes the on-board fuel separation system 200 and, based on the received (or stored) inputs, send control signals to, for example, one or more valves that adjust or control the temperature, the flow rates of the fuel stream 106, the fluid solvent stream 204, the solvent make-up stream 216, the raffinate and extract streams (flowing through conduits 110 and 112, respectively), or a combination thereof. The control system 218 may also be communicably coupled to the separator 208 to control, for example, operating temperature, pressure, or pressures, of the flash tank(s) in the separator 208. The control system 218 may also be communicably coupled to the liquid-liquid extraction unit 202 to control, for example, a volumetric ratio of the input fuel stream 106 and the fluid solvent stream 204 to the unit 202.

In some aspects, the control system 218 may control a composition and a flow rates of the extract and raffinate streams by controlling a composition of the fluid solvent stream 204. For example, the fluid solvent stream 204 may be comprised of multiple solvents stored in individual solvent containers (not shown). Each of the multiple solvents that are combined into the fluid solvent stream 204 may have different separation behaviors. For example, the system 200 can have two solvents stored in separate tanks with different properties. The first solvent has the capability to attract explicitly the high ON or cetane components. The second solvent attracts the high ON or cetane components with some other components from the input fuel stream 106, so it would have lower ON or cetane quality but with higher flow rate. Therefore, the engine would have the option to select between the first solvent (for higher ON or cetane rate) or the second solvent (for higher flow rate of the high ON or cetane stream).

The ability for the engine to select between fuel sources with different ON or cetane values may be beneficial. For example, in some implementations, at high load, gasoline engines require high octane (for example, long ignition delay) fuel to avoid knocking and engine damage. In some aspects, the on-board controller 218 may have an estimate of the amount of the high ON fuel (and associated ON value) based on a factory setting, driving history, or both. The controller 218 may have predictive functions that give the ON and flow values at each operating temperature of the separator 208, the fuel specifications (for example, vapor lock index, T95, and other specifications), the fluid solvent compositions, or otherwise. The controller 218 may then set the separator 208 temperature, the composition of the fluid solvent 204, or other operating characteristics, to particular values to maximize the amount of the high ON fuel.

In an example operation of the system 200, the input fuel stream 106 is circulated into the liquid-liquid extraction unit 202, along with the fluid solvent stream 204. The two streams—the fuel stream 106 and fluid solvent stream 204—are mixed (for example, contactingly) in the extraction unit 202. Based on the affinity that the first fractional component of the fuel stream 106 has for the solvent (or solvents) in the fluid solvent stream 204, separation of the fuel stream 106 into fractional components occurs in the extraction unit 202. The first fractional component binds with the solvents and is circulated as the solvent-extract stream 206 to the separator 208. The remaining, or second, fractional component of the fuel stream 106 (that is, the raffinate), is circulated through the fractional conduit 110 to be stored in the fractional fuel tank 114. Of course in some aspects, there may be more than two fractional components after separation in the extraction unit 202, such as, for example, when multiple solvents comprise the fluid solvent stream 204, and each solvent attracts a particular, distinct fractional component of the fuel stream 106.

The solvent-extract stream 206 is circulated to the separator 208, where the solvent (or solvents) is separated from the extract (that is, the first fractional fuel component of the fuel stream 106). The separator 208, for instance, may separate the solvent from the extract in one or more flash tanks or distillation units, based on, for example, a difference in boiling points of the solvent(s) and extract. For example, if multiple solvents comprise the fluid solvent stream 204, there may be multiple flash tanks used to separate the solvents from the extract(s) (for example, at different operating temperatures based on the boiling point differences in the solvents and extracts).

The separated extract is then circulated in the fractional conduit 112 to the fractional fuel tank 116. The stored fuel fractional components in the fractional fuel tanks 114 and 116 each have distinct auto-ignition characteristic values, such as ON or cetane number. In some examples, the fractional component stored in the fractional fuel tank 114 (for example, the raffinate) has a higher ON than the fractional fuel component stored in the fractional fuel tank 116 (for example, the extract). The difference in ON of the stored fuel fractions may depend, at least in part, on the particular solvent or solvents selected for the fluid solvent stream 204 (for example, solvents that attract aromatics, solvents that attract oxygenates, or otherwise).

The separated fluid solvent 204 is recirculated from the separator 208 to the extraction unit 202. If, based on a measurement of the flow rate (for example, by the flow meter 212) of the separated fluid solvent stream 204 between the separator 208 and the extraction unit 202, it is determined that insufficient fluid solvent is circulating to the extraction unit 202, additional fluid solvent 216 may be passed from the make-up tank 210 to the extraction unit 202. In some aspects, for example, a particular volumetric flow rate of the fluid solvent stream 204 is needed to achieve a desired ratio of solvent to fuel stream 106, in order to achieve desired RONs of the separated fractional fuel components stored in fractional fuel tanks 114 and 116. If the flow rate of the separated fluid solvent stream 204 between the separator 208 and the extraction unit 202 is sufficient, then no additional fluid solvent 216 may be added.

Figure 3A:
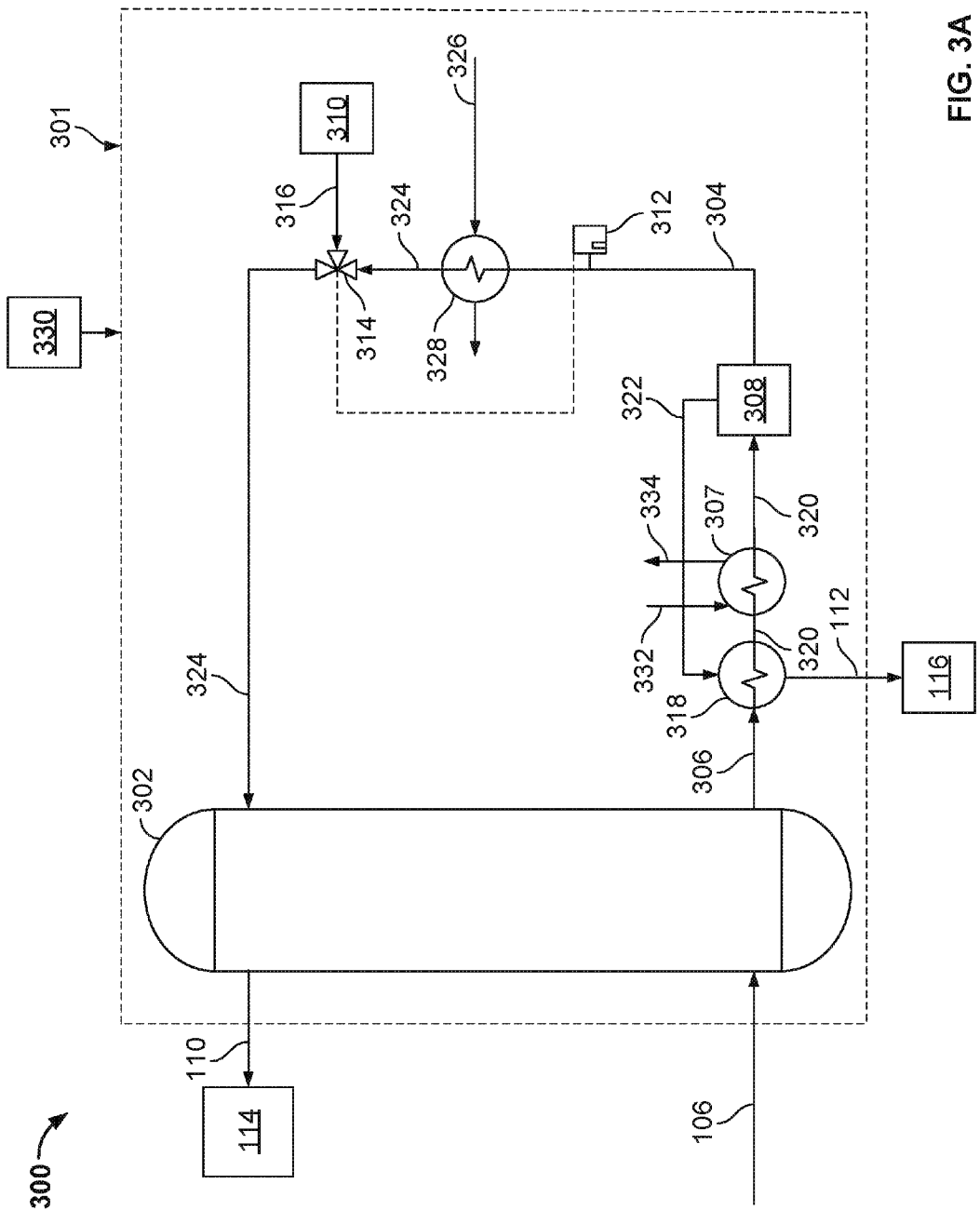
FIGS. 3A-3B are schematic illustrations of other example implementations of an on-board fuel separation system according to the present disclosure.
Figure 3B:
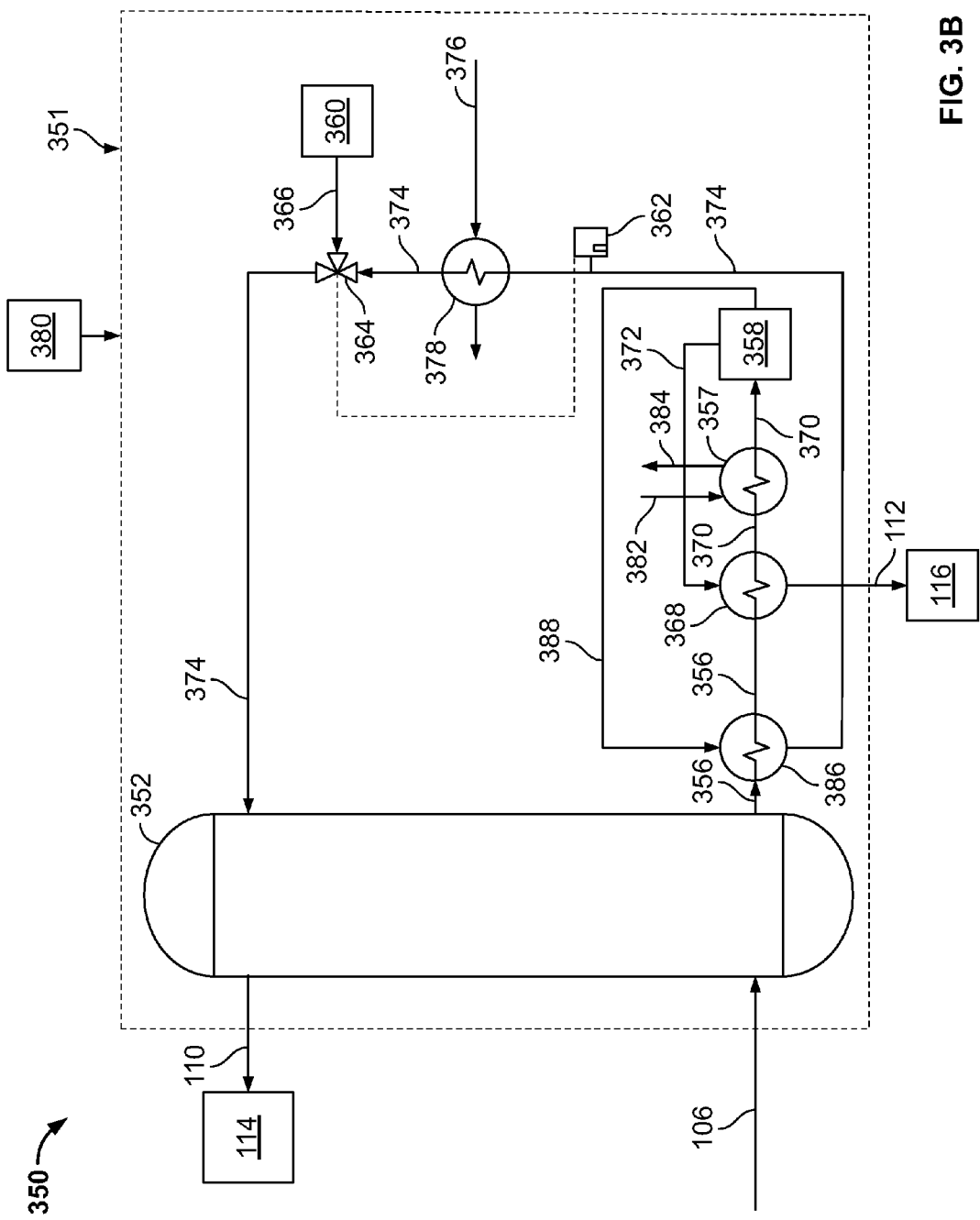
Figure 4A:
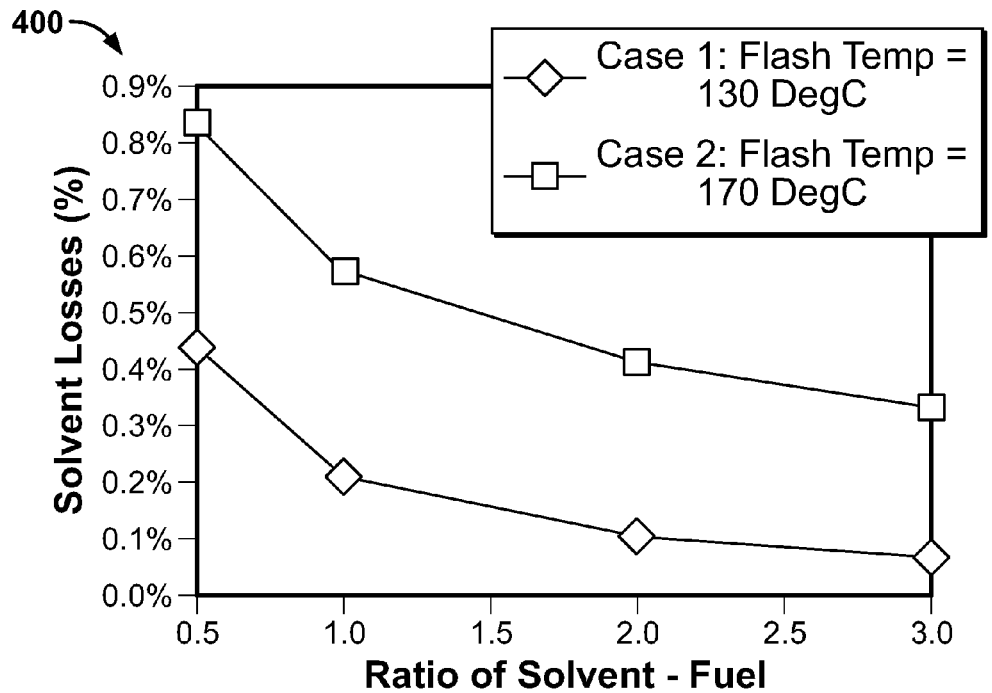
FIGS. 4A-4E are graphs that illustrate results of a simulation model of an on-board fuel separation system according to the present disclosure.
Figure 4B:
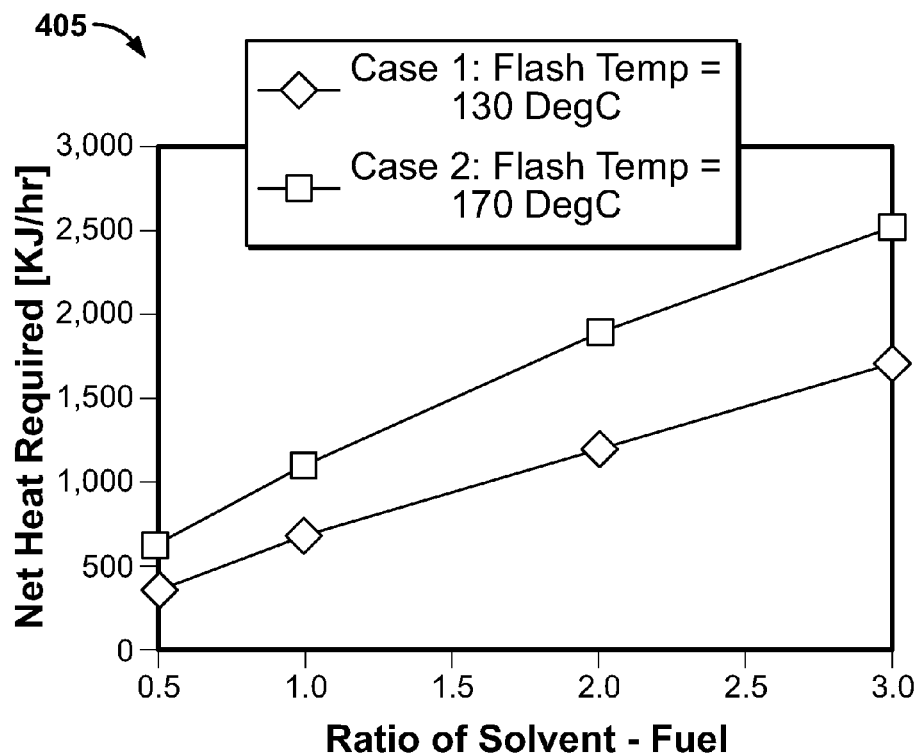
Figure 4C:
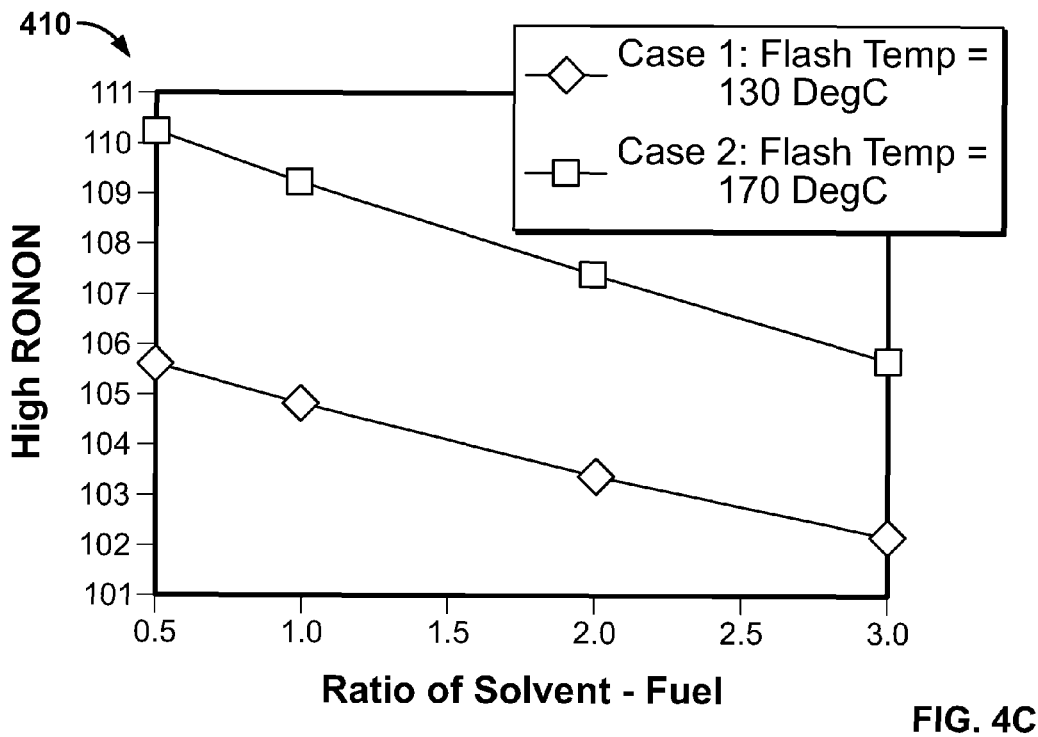
Figure 4D:
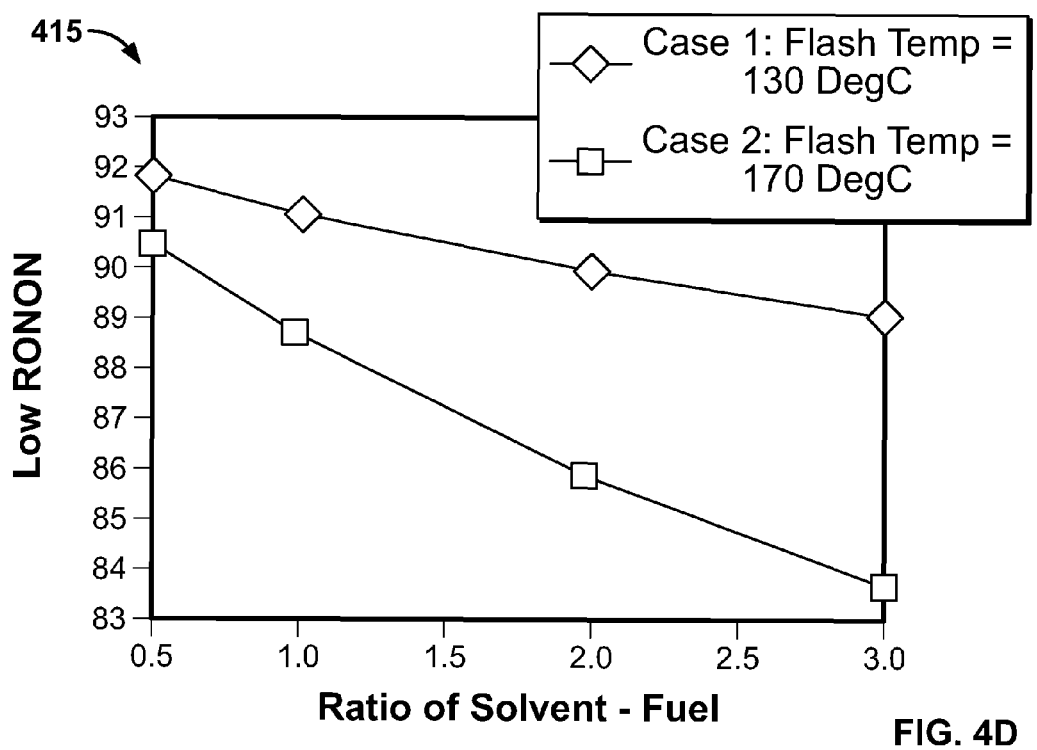
Figure 4E:
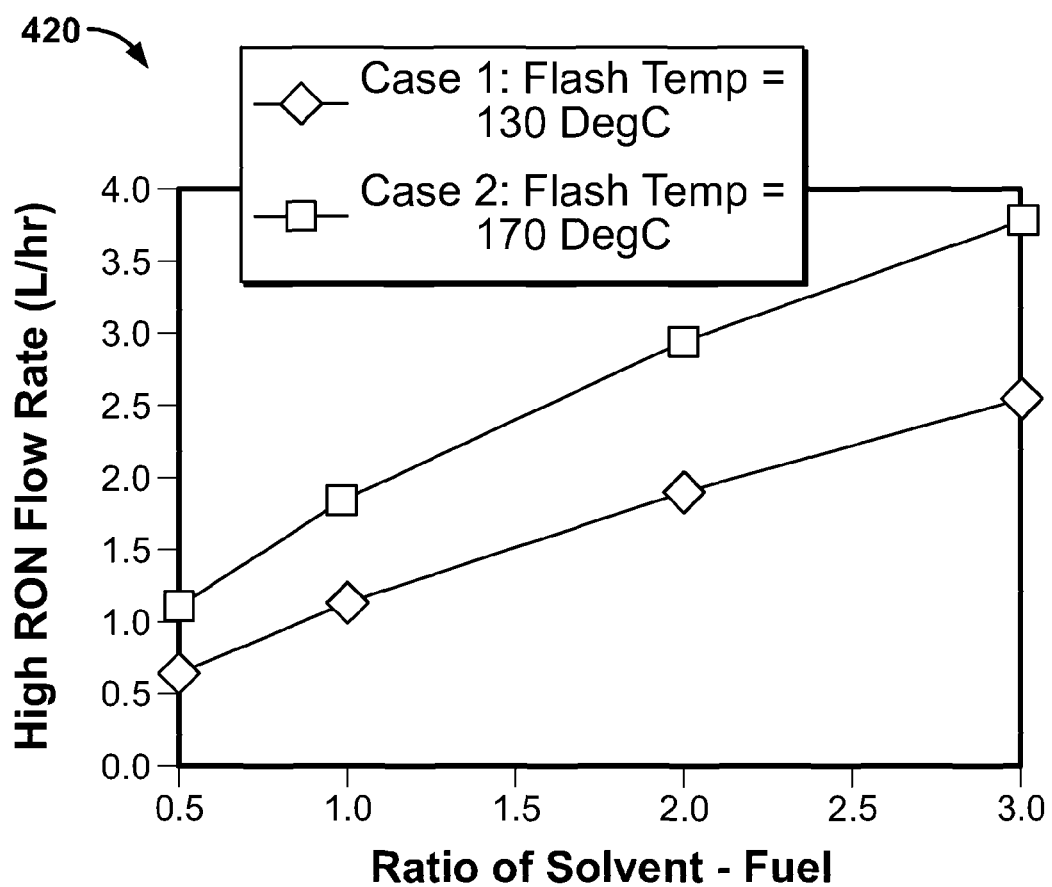

FIGS. 3A-3B are schematic illustrations of other example implementations of an on-board fuel separation system 300 and on-board fuel separation system 350, respectively, according to the present disclosure. With respect to FIG. 3A, in some aspects, at least a portion of the system 300 may be implemented as the on-board fuel separation system 108 in the vehicle 102 shown in FIG. 1. System 300 may be similar to system 200, shown in FIG. 2, but also includes one or more heat exchangers that may be operated to add or remove heat from one or more of the fluid streams that circulate within the system 300.

The illustrated on-board fuel separation system 300 includes an on-board fuel separation sub-assembly 301 (designated by the dashed line) that includes several components. In alternative example implementations, more or fewer of the illustrated components may be included in the on-board fuel separation sub-assembly 301.

As illustrated, the fuel stream 106 may be received at an extraction unit 302. The extraction unit 302 also receives an input of a fluid solvent stream 324. In some aspects, both of the fuel stream 106 and fluid solvent stream 324 are input to the extraction unit 302 in liquid form, and the extraction unit 302 is a liquid-liquid extraction unit 302. The liquid-liquid extraction unit 302 may include or have a certain shape with a maximum contact area between the fuel stream 106 and the fluid solvent stream 324 for better effectiveness of separation. The liquid-liquid extraction unit 302 may include one or more (equilibrium) stages.

The fluid solvent stream 324 includes one or more fluid solvents to which components of the input fuel stream 106 have an affinity. For example, in some aspects, the fluid solvent stream 324 may include a fluid solvent to which aromatics of the input fuel stream 106 have an affinity. Example solvents include dimethyl sulfoxide, sulfolane, propylene carbonates, ethylene glycol, diethylene glycol, triethylene glycol, tetraethylene glycol, N-formylmorpholine, furan, tetrahydrofuran, pyrrolidine, pyrrole, thiophene, some ionic liquids and other solvents that can be used in the extraction unit 302 to separate aromatics of the input fuel stream 106 from other fuel components of the stream 106. As another example, in some aspects, the fluid solvent stream 324 may include a fluid solvent to which oxygenates of the input fuel stream 106 have an affinity. Example solvents include amyl acetate, benzyl alcohol, methyl isobutyl ketone, water, certain ionic liquids, and other solvents that can be used in the extraction unit 302 to separate oxygenates in the input fuel stream 106 from other components of the stream 106.

For separating both aromatics and oxygenates from the fuel stream 106, solvents common to both, or a mixture of solvents, can be used in the fluid solvent stream 324. In some aspects, traces of the solvents used may be circulated to an engine (for example, engine 124) and combust with the fuel input to the engine (for example, one of fuel stream 118 or 120). Oxygen containing solvents, such as glycols, could provide positive effects such as an increase in octane number for gasoline engines, or an increase in lubricity for diesel engines. In contrast, solvents with sulfur or nitrogen atoms, such as sulflolane and N-formylmorpholine, may increase SOx or NOx emissions in combustion of these solvents.

As illustrated in this example, two liquid streams are output from the extraction unit 302. A mixed solvent-extract stream 306 is output from the extraction unit 302 and includes a mixture of the fluid solvent stream 324 and a first fractional component of the input fuel stream 106 (in other words, the extract). The first fractional component of the input fuel stream 106 may include, for example, a portion of the fuel stream that is defined by a particular auto-ignition characteristic value (for example, ON or cetane number). Also output from the extraction unit 302 is a second fractional component of the input fuel stream 106, which is carried to the fractional fuel tank 114 in fractional fuel conduit 110. The second fractional component (in other words, the raffinate) of the input fuel stream 106, therefore, is separated from the remaining input fuel stream 106, which is mixed with the solvent in the solvent-extract stream 306. Like the first fractional component (extract), the second fractional component (raffinate) may be defined by another particular auto-ignition characteristic value (for example, ON or cetane number). The raffinate, therefore, may be stored in the fractional fuel tank 114 for use by the engine.

In examples where the auto-ignition characteristic value is ON, for instance, the extract and the raffinate may have different RONs, depending on a variety of factors. For example, a volumetric ratio of the fluid solvent stream 324 to the input fuel stream 106 may determine, at least in part, a difference in RONs between the extract and raffinate output from the extraction unit 302. As another example, operating characteristics of one or more of the components of the on-board fuel separation sub-assembly 301 may vary a difference in RONs of the extract and raffinate.

The solvent-extract stream 306 is circulated through a heat exchanger 318 (for example, shell and tube, fin and tube, plate and frame, or otherwise) to heat the solvent-extract stream 306 with a flow of the first fractional component 322 that has been separated from the fluid solvent 324 in a separator 308. For example, in some aspects, the first fractional component 322 may be in a vapor phase (or mixed vapor-liquid phase) upon exit from the separator 308. Heat transferred from the first fractional component 322 to the solvent-extract stream 306 may condense the vapor of component 322 into a liquid phase to be stored in the fractional fuel tank 116 (for example, for use by an engine).

As shown, the heated solvent-extract stream 320 is circulated to a second heat exchanger 307. Here, the heated solvent-extract stream 320 may be further heated with heat transferred (in the heat exchanger 307) from an engine exhaust supply 332 (for example, from the engine 124). Heat from the engine exhaust supply 332 is transferred to the heated solvent-extract stream 320 to, for example, bring a temperature of the heated solvent-extract stream 320 to a desired or specified separator temperature operation (for separation in separator 308). An engine exhaust return 334, which is cooler than the engine exhaust supply 332, leaves the heat exchanger 307 (for example, and exhausted from the vehicle).

As illustrated in FIG. 3A, the further heated solvent-extract stream 320 is circulated to a separator 308. The separator 308 separates the solvent and the extract and outputs a fluid solvent stream 304 and the first fractional component 322 that is circulated through the heat exchanger 318 and then through in the fractional fuel conduit 112 to the fractional fuel tank 116. In some examples, the separator 308 is a flash tank or distillation unit that separates the solvent and the extract based on a difference in boiling points of the solvent and extract. For example, a solvent with high boiling point may be separated from an extract with a low boiling point (for example, in fuel streams 106 of gasoline or naphtha). For a high boiling point fuel stream 106, such as diesel and middle distillates, a solvent with a low boiling point may be used to ensure complete or almost complete separation of the extract and solvent in the separator 308. The separated extract may be stored in the fractional fuel tank 116 for use by the engine, thereby providing the engine with at least two different fuel sources: a fuel source stored in fractional fuel tank 114 with a particular auto-ignition characteristic value, and a fuel source stored in fractional fuel tank 116 with a different, particular auto-ignition characteristic value.

The fluid solvent stream 304 is recirculated from the separator 308 to the extraction unit 302. In some aspects, a cooler 328 (for example, a radiator or other liquid-air heat exchange device), as shown in FIG. 3A, is used to cool the relatively hot fluid solvent 304 prior to recirculation of the solvent 304 to the extraction unit 302. For example, in some example implementations, an ambient airflow 326 (or other cool fluid stream) is circulated through the cooler 328 to cool the fluid solvent stream 304.

In this example implementation, a solvent make-up system is fluidly coupled to the separator 308 and the extraction unit 302. In this example, the solvent make-up system includes a solvent make-up tank 310 that is fluidly coupled to a solvent regulator 314 (for example, a control valve, variable orifice, or other controllable liquid regulator), and a flow meter 312. In this example, the flow meter 312 may measure or estimate a flow rate of the fluid solvent stream 304 from the separator 308 and provide the flow rate information to the make-up tank 316 (for example, in the case of a flow switch), the solvent regulator 314, a control system 330 that is communicably coupled to the on-board fuel separation sub-assembly 301, or a combination thereof. If the flow rate of the fluid solvent stream 304 drops below a predetermined value (for example, if some of the fluid solvent does not separate from the extract in the separator 308, or is circulated to the fractional fuel tank 114 with the raffinate), then fluid solvent 316 from the make-up tank 310 may be circulated through the solvent regulator 314 to combine with the fluid solvent stream 324.

As illustrated, the on-board fuel separation system 300 includes a control system 330 that is communicably coupled to the on-board fuel separation sub-assembly 301 to control one or more components of the sub-assembly 301 (for example, the extraction unit 302, the separator 308, the solvent make-up system or other components (for example, valves, pumps, and other components, not shown). In some aspects, the control system 330 may be a mechanical, pneumatic, electro-mechanical, or micro-processor based control system (or a combination thereof). The control system 330 may receive (or store) inputs associated with engine operating characteristics of an engine of a vehicle that includes the on-board fuel separation system 300 and, based on the received (or stored) inputs, send control signals to, for example, one or more valves that adjust or control the temperature, the flow rates of the fuel stream 106, the fluid solvent stream 324, the solvent make-up stream 316, the raffinate and extract streams (flowing through conduits 110 and 112, respectively), or a combination thereof. The control system 330 may also be communicably coupled to the separator 308 to control, for example, operating temperature, pressure, or pressures, of the flash tank(s) in the separator 308. The control system 330 may also be communicably coupled to the liquid-liquid extraction unit 302 to control, for example, a volumetric ratio of the input fuel stream 106 and the fluid solvent stream 324 to the unit 302.

In some aspects, the control system 330 may control a composition and a flow rates of the extract and raffinate streams by controlling a composition of the fluid solvent stream 304. For example, the fluid solvent stream 304 may be comprised of multiple solvents stored in individual solvent containers (not shown). Each of the multiple solvents that are combined into the fluid solvent stream 304 may have different separation behaviors. For example, the system 300 can have two solvents stored in separate tanks with different properties. The first solvent has the capability to attract explicitly the high ON or cetane components. The second solvent attracts the high ON or cetane components with some other components from the input fuel stream 106, so it would have lower ON or cetane quality but with higher flow rate. Therefore, the engine would have the option to select between the first solvent (for higher ON or cetane rate) or the second solvent (for higher flow rate of the high ON or cetane stream).

The ability for the engine to select between fuel sources with different ON or cetane values may be beneficial. For example, in some implementations, at high load, gasoline engines require high octane (for example, long ignition delay) fuel to avoid knocking and engine damage. In some aspects, the on-board controller 330 may have an estimate of the amount of the high ON fuel (and associated ON value) based on a factory setting, driving history, or both. The controller 330 may have predictive functions that give the ON and flow values at each operating temperature of the separator 308, the fuel specifications (for example, vapor lock index, T95, and other specifications), the fluid solvent compositions, or otherwise. The controller 330 may then set the separator 308 temperature, the composition of the fluid solvent 324, or other operating characteristics, to particular values to maximize the amount of the high ON fuel.

In an example operation of the system 300, the input fuel stream 106 is circulated into the liquid-liquid extraction unit 302, along with the fluid solvent stream 324. The two streams—the fuel stream 106 and fluid solvent stream 324—are mixed (for example, contactingly) in the extraction unit 302. Based on the affinity that the first fractional component of the fuel stream 106 has for the solvent (or solvents) in the fluid solvent stream 324, separation of the fuel stream 106 into fractional components occurs in the extraction unit 302. The first fractional component binds with the solvents and is circulated as the solvent-extract stream 306 to the heat exchanger 318. The remaining, or second, fractional component of the fuel stream 106 (that is, the raffinate), is circulated through the fractional conduit 110 to be stored in the fractional fuel tank 114. Of course in some aspects, there may be more than two fractional components after separation in the extraction unit 302, such as, for example, when multiple solvents comprise the fluid solvent stream 324, and each solvent attracts a particular, distinct fractional component of the fuel stream 106.

The solvent-extract stream 306 is circulated to the heat exchanger 318, where heat is added to the stream 306 from the first fractional component stream 322 output by the separator 308. For example, the first fractional component stream 322 may not be condensed, or fully condensed, from the separator 308. Upon transferring heat from the stream 322 to the stream 306, the stream 322 may fully or more fully condense to be stored (for example, in liquid phase) in the fractional fuel tank 116.

The heated solvent-extract stream 320 is then circulated to the second heat exchanger 307, where it is further heated by a flow of the engine exhaust supply 332. In some implementations, if a temperature of the heated solvent-extract stream 320 that leaves the heat exchanger 318 is at a desired or required operation temperature of the separator 308, the stream 320 may bypass the second heat exchanger 307 (or the second heat exchanger 307 may be eliminated). The further heated solvent-extract stream 320 is then circulated to the separator 308, where the solvent (or solvents) is separated from the extract (that is, the first fractional fuel component of the fuel stream 106). The separator 308, for instance, may separate the solvent from the extract in one or more flash tanks or distillation units, based on, for example, a difference in boiling points of the solvent(s) and extract. For example, if multiple solvents comprise the fluid solvent stream 324, there may be multiple flash tanks used to separate the solvents from the extract(s) (for example, at different operating temperatures based on the boiling point differences in the solvents and extracts).

The separated extract 322 is then circulated, through the heat exchanger 318, and in the fractional conduit 112 to the fractional fuel tank 116. The stored fuel fractional components in the fractional fuel tanks 114 and 116 each have distinct auto-ignition characteristic values, such as ON or cetane number. In some examples, the fractional component stored in the fractional fuel tank 114 (for example, the raffinate) has a higher ON than the fractional fuel component stored in the fractional fuel tank 116 (for example, the extract). The difference in ON of the stored fuel fractions may depend, at least in part, on the particular solvent or solvents selected for the fluid solvent stream 324 (for example, solvents that attract aromatics, solvents that attract oxygenates, or otherwise).

The separated fluid solvent 304 is circulated from the separator 308 to cooler 328, where the ambient airflow 326 (or other cool fluid stream) cools the fluid solvent stream 304. The fluid solvent stream 324 is then circulated to the extraction unit 302. If, based on a measurement of the flow rate (for example, by the flow meter 312) of the separated fluid solvent stream 304 between the separator 308 and the extraction unit 302, it is determined that insufficient fluid solvent is circulating to the extraction unit 302, additional fluid solvent 316 may be passed from the make-up tank 310 to the extraction unit 302. In some aspects, for example, a particular volumetric flow rate of the fluid solvent stream 324 is needed to achieve a desired ratio of solvent to fuel stream 106, in order to achieve desired RONs of the separated fractional fuel components stored in fractional fuel tanks 114 and 116. If the flow rate of the separated fluid solvent stream 324 between the separator 308 and the extraction unit 302 is sufficient, then no additional fluid solvent 316 may be added.

With respect to FIG. 3B, in some aspects, at least a portion of the system 350 may be implemented as the on-board fuel separation system 108 in the vehicle 102 shown in FIG. 1. System 350 may be similar to system 200, shown in FIG. 2, but also includes one or more heat exchangers that may be operated to add or remove heat from one or more of the fluid streams that circulate within the system 350.

The illustrated on-board fuel separation system 350 includes an on-board fuel separation sub-assembly 351 (designated by the dashed line) that includes several components. In alternative example implementations, more or fewer of the illustrated components may be included in the on-board fuel separation sub-assembly 351.

As illustrated, the fuel stream 106 may be received at an extraction unit 352. The extraction unit 352 also receives an input of a fluid solvent stream 374. In some aspects, both of the fuel stream 106 and fluid solvent stream 374 are input to the extraction unit 352 in liquid form, and the extraction unit 352 is a liquid-liquid extraction unit 352. The liquid-liquid extraction unit 352 may include or have a certain shape with a maximum contact area between the fuel stream 106 and the fluid solvent stream 374 for better effectiveness of separation. The liquid-liquid extraction unit 352 may include one or more (equilibrium) stages.

The fluid solvent stream 374 includes one or more fluid solvents to which components of the input fuel stream 106 have an affinity. For example, in some aspects, the fluid solvent stream 374 may include a fluid solvent to which aromatics of the input fuel stream 106 have an affinity. Example solvents include dimethyl sulfoxide, sulfolane, propylene carbonates, ethylene glycol, diethylene glycol, triethylene glycol, tetraethylene glycol, N-formylmorpholine, furan, tetrahydrofuran, pyrrolidine, pyrrole, thiophene, some ionic liquids and other solvents that can be used in the extraction unit 352 to separate aromatics of the input fuel stream 106 from other fuel components of the stream 106. As another example, in some aspects, the fluid solvent stream 374 may include a fluid solvent to which oxygenates of the input fuel stream 106 have an affinity. Example solvents include amyl acetate, benzyl alcohol, methyl isobutyl ketone, water, certain ionic liquids, and other solvents that can be used in the extraction unit 352 to separate oxygenates in the input fuel stream 106 from other components of the stream 106.

For separating both aromatics and oxygenates from the fuel stream 106, solvents common to both, or a mixture of solvents, can be used in the fluid solvent stream 374. In some aspects, traces of the solvents used may be circulated to an engine (for example, engine 124) and combust with the fuel input to the engine (for example, one of fuel stream 118 or 120). Oxygen containing solvents, such as glycols, could provide positive effects such as an increase in octane number for gasoline engines, or an increase in lubricity for diesel engines. In contrast, solvents with sulfur or nitrogen atoms, such as sulflolane and N-formylmorpholine, may increase SOx or NOx emissions in combustion of these solvents.

As illustrated in this example, two liquid streams are output from the extraction unit 352. A mixed solvent-extract stream 356 is output from the extraction unit 352 and includes a mixture of the fluid solvent stream 374 and a first fractional component of the input fuel stream 106 (in other words, the extract). The first fractional component of the input fuel stream 106 may include, for example, a portion of the fuel stream that is defined by a particular auto-ignition characteristic value (for example, ON or cetane number). Also output from the extraction unit 352 is a second fractional component of the input fuel stream 106, which is carried to the fractional fuel tank 114 in fractional fuel conduit 110. The second fractional component (in other words, the raffinate) of the input fuel stream 106, therefore, is separated from the remaining input fuel stream 106, which is mixed with the solvent in the solvent-extract stream 356. Like the first fractional component (extract), the second fractional component (raffinate) may be defined by another particular auto-ignition characteristic value (for example, ON or cetane number). The raffinate, therefore, may be stored in the fractional fuel tank 114 for use by the engine.

In examples where the auto-ignition characteristic value is ON, for instance, the extract and the raffinate may have different RONs, depending on a variety of factors. For example, a volumetric ratio of the fluid solvent stream 374 to the input fuel stream 106 may determine, at least in part, a difference in RONs between the extract and raffinate output from the extraction unit 352. As another example, operating characteristics of one or more of the components of the on-board fuel separation sub-assembly 351 may vary a difference in RONs of the extract and raffinate.

The solvent-extract stream 356 is circulated through a heat exchanger 386 (for example, shell and tube, fin and tube, plate and frame, or otherwise) to heat the solvent-extract stream 356 with a flow of fluid solvent stream 388 that has been separated from the first fractional component 372 in a separator 358. The solvent stream 388, which is hot relative to the solvent extract stream 356, transfers heat to the solvent-extract stream 356 and is then circulated to a cooler 378 as a heated solvent stream 374.

The heated solvent-extract stream 356 is then circulated through a heat exchanger 368 (for example, shell and tube, fin and tube, plate and frame, or otherwise) to further heat the solvent-extract stream 356 with the first fractional component 372 that has been separated from the fluid solvent 388 in the separator 358. For example, in some aspects, the first fractional component 372 may be in a vapor phase (or mixed vapor-liquid phase) upon exit from the separator 358. Heat transferred from the first fractional component 372 to the solvent-extract stream 356 may condense the vapor of component 372 into a liquid phase to be stored in the fractional fuel tank 116 (for example, for use by an engine).

As shown, the heated solvent-extract stream 370 is then circulated to a third heat exchanger 357. Here, the heated solvent-extract stream 370 may be further heated with heat transferred (in the heat exchanger 357) from an engine exhaust supply 382 (for example, from the engine 124). Heat from the engine exhaust supply 382 is transferred to the heated solvent-extract stream 370 to, for example, bring a temperature of the heated solvent-extract stream 370 to a desired or specified separator temperature operation (for separation in separator 358). An engine exhaust return 384, which is cooler than the engine exhaust supply 382, leaves the heat exchanger 357 (for example, and exhausted from the vehicle).

As illustrated in FIG. 3B, the further heated solvent-extract stream 370 is circulated to the separator 358. The separator 358 separates the solvent and the extract and outputs a fluid solvent stream 388 (to the heat exchanger 386) and the first fractional component 372 that is circulated through the heat exchanger 368 and then through in the fractional fuel conduit 112 to the fractional fuel tank 116. In some examples, the separator 358 is a flash tank or distillation unit that separates the solvent and the extract based on a difference in boiling points of the solvent and extract. For example, a solvent with high boiling point may be separated from an extract with a low boiling point (for example, in fuel streams 106 of gasoline or naphtha). For a high boiling point fuel stream 106, such as diesel and middle distillates, a solvent with a low boiling point may be used to ensure complete or almost complete separation of the extract and solvent in the separator 358. The separated extract may be stored in the fractional fuel tank 116 for use by the engine, thereby providing the engine with at least two different fuel sources: a fuel source stored in fractional fuel tank 114 with a particular auto-ignition characteristic value, and a fuel source stored in fractional fuel tank 116 with a different, particular auto-ignition characteristic value.

The heated fluid solvent stream 374 from the heat exchanger 386 is recirculated from the separator 358 to the extraction unit 352. In some aspects, a cooler 378 (for example, a radiator or other liquid-air heat exchange device), as shown in FIG. 3B, is used to cool the relatively hot fluid solvent 374 prior to recirculation of the solvent 374 to the extraction unit 352. For example, in some example implementations, an ambient airflow 376 (or other cool fluid stream) is circulated through the cooler 378 to cool the fluid solvent stream 374.

In this example implementation, a solvent make-up system is fluidly coupled to the separator 358 and the extraction unit 352. In this example, the solvent make-up system includes a solvent make-up tank 360 that is fluidly coupled to a solvent regulator 364 (for example, a control valve, variable orifice, or other controllable liquid regulator), and a flow meter 362. In this example, the flow meter 362 may measure or estimate a flow rate of the fluid solvent stream 374 from the separator 358 and provide the flow rate information to the make-up tank 366 (for example, in the case of a flow switch), the solvent regulator 364, a control system 380 that is communicably coupled to the on-board fuel separation sub-assembly 351, or a combination thereof. If the flow rate of the fluid solvent stream 374 drops below a predetermined value (for example, if some of the fluid solvent does not separate from the extract in the separator 358, or is circulated to the fractional fuel tank 114 with the raffinate), then fluid solvent 366 from the make-up tank 360 may be circulated through the solvent regulator 364 to combine with the fluid solvent stream 374.

As illustrated, the on-board fuel separation system 350 includes a control system 380 that is communicably coupled to the on-board fuel separation sub-assembly 351 to control one or more components of the sub-assembly 351 (for example, the extraction unit 352, the separator 358, the solvent make-up system or other components (for example, valves, pumps, and other components, not shown). In some aspects, the control system 380 may be a mechanical, pneumatic, electro-mechanical, or micro-processor based control system (or a combination thereof). The control system 380 may receive (or store) inputs associated with engine operating characteristics of an engine of a vehicle that includes the on-board fuel separation system 350 and, based on the received (or stored) inputs, send control signals to, for example, one or more valves that adjust or control the temperature, the flow rates of the fuel stream 106, the fluid solvent stream 374, the solvent make-up stream 366, the raffinate and extract streams (flowing through conduits 110 and 112, respectively), or a combination thereof. The control system 380 may also be communicably coupled to the separator 358 to control, for example, operating temperature, pressure, or pressures, of the flash tank(s) in the separator 358. The control system 380 may also be communicably coupled to the liquid-liquid extraction unit 352 to control, for example, a volumetric ratio of the input fuel stream 106 and the fluid solvent stream 374 to the unit 352.

In some aspects, the control system 380 may control a composition and a flow rates of the extract and raffinate streams by controlling a composition of the fluid solvent stream 354. For example, the fluid solvent stream 354 may be comprised of multiple solvents stored in individual solvent containers (not shown). Each of the multiple solvents that are combined into the fluid solvent stream 354 may have different separation behaviors. For example, the system 350 can have two solvents stored in separate tanks with different properties. The first solvent has the capability to attract explicitly the high ON or cetane components. The second solvent attracts the high ON or cetane components with some other components from the input fuel stream 106, so it would have lower ON or cetane quality but with higher flow rate. Therefore, the engine would have the option to select between the first solvent (for higher ON or cetane rate) or the second solvent (for higher flow rate of the high ON or cetane stream).

The ability for the engine to select between fuel sources with different ON or cetane values may be beneficial. For example, in some implementations, at high load, gasoline engines require high octane (for example, long ignition delay) fuel to avoid knocking and engine damage. In some aspects, the on-board controller 380 may have an estimate of the amount of the high ON fuel (and associated ON value) based on a factory setting, driving history, or both. The controller 380 may have predictive functions that give the ON and flow values at each operating temperature of the separator 358, the fuel specifications (for example, vapor lock index, T95, and other specifications), the fluid solvent compositions, or otherwise. The controller 380 may then set the separator 358 temperature, the composition of the fluid solvent 374, or other operating characteristics, to particular values to maximize the amount of the high ON fuel.

In an example operation of the system 350, the input fuel stream 106 is circulated into the liquid-liquid extraction unit 352, along with the fluid solvent stream 374. The two streams—the fuel stream 106 and fluid solvent stream 374—are mixed (for example, contactingly) in the extraction unit 352. Based on the affinity that the first fractional component of the fuel stream 106 has for the solvent (or solvents) in the fluid solvent stream 374, separation of the fuel stream 106 into fractional components occurs in the extraction unit 352. The first fractional component binds with the solvents and is circulated as the solvent-extract stream 356 to the heat exchanger 368. The remaining, or second, fractional component of the fuel stream 106 (that is, the raffinate), is circulated through the fractional conduit 110 to be stored in the fractional fuel tank 114. Of course in some aspects, there may be more than two fractional components after separation in the extraction unit 352, such as, for example, when multiple solvents comprise the fluid solvent stream 374, and each solvent attracts a particular, distinct fractional component of the fuel stream 106.

The solvent-extract stream 356 is circulated to the heat exchanger 386, where heat is added to the stream 356 from the fluid solvent stream 388 output by the separator 358. The fluid solvent stream 388 then is circulated (at a lower temperature) as the fluid solvent stream 374 back to the extractor 352.

The heated solvent-extract stream 356 is then circulated to the heat exchanger 368, where heat is added to the stream 356 from the first fractional component stream 372 output by the separator 358. For example, the first fractional component stream 372 may not be condensed, or fully condensed, from the separator 358. Upon transferring heat from the stream 372 to the stream 356, the stream 372 may fully or more fully condense to be stored (for example, in liquid phase) in the fractional fuel tank 116.

The further heated solvent-extract stream 370 is then circulated to the third heat exchanger 357, where it is further heated by a flow of the engine exhaust supply 382. In some implementations, if a temperature of the heated solvent-extract stream 370 that leaves the heat exchanger 368 is at a desired or required operation temperature of the separator 358, the stream 370 may bypass the third heat exchanger 357 (or the third heat exchanger 357 may be eliminated). The further heated solvent-extract stream 370 is then circulated to the separator 358, where the solvent (or solvents) is separated from the extract (that is, the first fractional fuel component of the fuel stream 106). The separator 358, for instance, may separate the solvent from the extract in one or more flash tanks or distillation units, based on, for example, a difference in boiling points of the solvent(s) and extract. For example, if multiple solvents comprise the fluid solvent stream 374, there may be multiple flash tanks used to separate the solvents from the extract(s) (for example, at different operating temperatures based on the boiling point differences in the solvents and extracts).

The separated extract 372 is then circulated, through the heat exchanger 368, and in the fractional conduit 112 to the fractional fuel tank 116. The stored fuel fractional components in the fractional fuel tanks 114 and 116 each have distinct auto-ignition characteristic values, such as ON or cetane number. In some examples, the fractional component stored in the fractional fuel tank 114 (for example, the raffinate) has a higher ON than the fractional fuel component stored in the fractional fuel tank 116 (for example, the extract). The difference in ON of the stored fuel fractions may depend, at least in part, on the particular solvent or solvents selected for the fluid solvent stream 374 (for example, solvents that attract aromatics, solvents that attract oxygenates, or otherwise).

The separated fluid solvent 388, which leaves the heat exchanger 386 as the fluid solvent stream 374, is circulated from to cooler 378, where the ambient airflow 376 (or other cool fluid stream) cools the fluid solvent stream 374. The fluid solvent stream 374 is then circulated to the extraction unit 352. If, based on a measurement of the flow rate (for example, by the flow meter 362) of the separated fluid solvent stream 374 between the separator 358 and the extraction unit 352, it is determined that insufficient fluid solvent is circulating to the extraction unit 352, additional fluid solvent 366 may be passed from the make-up tank 360 to the extraction unit 352. In some aspects, for example, a particular volumetric flow rate of the fluid solvent stream 374 is needed to achieve a desired ratio of solvent to fuel stream 106, in order to achieve desired RONs of the separated fractional fuel components stored in fractional fuel tanks 114 and 116. If the flow rate of the separated fluid solvent stream 374 between the separator 358 and the extraction unit 352 is sufficient, then no additional fluid solvent 366 may be added.

FIGS. 4A-4E are graphs 400, 405, 410, 415, and 420, respectively, that illustrate results of a simulation model of an on-board fuel separation system according to the present disclosure. The simulation model which results are shown in graphs 400, 405, 410, 415, and 420 simulates an operation of an on-board fuel separation system for a vehicle that includes heat exchangers, for example, as shown in system 300 in FIG. 3A.

In the simulation model of FIGS. 4A-4E, the solvent used for the studied case is triethylene glycol that has been fed to a liquid-liquid extraction unit (for example, extraction unit 302) and mixed with 91 RON Saudi Arabian gasoline. The liquid-liquid extraction unit has one stage, and a fluid solvent stream and a fuel input stream (for example, the 91 RON gasoline) were fed to the extraction unit at ambient conditions (Pressure=1 bar, Temperature=23° C.). The flow rate of the input fuel stream is fixed to 10 liters/hour and the fluid solvent flow rate varied from 5-30 liters/hour. This variation in volumetric flow rate ratio made for a fluid solvent-to-fuel ratio of between 0.5-3.

In this simulation model, two simulations are shown to account for two different operating temperatures of a separator (for example, a flash tank separator). The two flash-tank temperatures are 130° C. and 170° C., which are high enough to evaporate most of the fuel (91 RON Saudi Arabian gasoline with a dew point of 120.6° C.). In addition, in the simulations shown in FIGS. 4A-4E, a temperature of a condensed high RON fuel fraction (for example, the first fractional component 372) was fixed to be 10° C. higher than a temperature of a solvent-extract input to the separator (for example, the solvent-extract 370) for modeling purposes.

Graph 400 illustrates a percentage of solvent losses vs. ratio of solvent to fuel for the two simulation cases (for example, separator operation at 130° C. and separator operation at 170° C.). As shown in graph 400, as the solvent-fuel ratio increases, the solvent lost (for example, into the first fractional component stream, or extract, or the second fractional component stream, or raffinate) as a percent of the total solvent volume in the on-board fuel separation system decreases. A rate of change of the solvent loss percentage becomes asymptotic as the solvent-fuel ratio increases. For the simulation model at 170° C. separator operation temperature, the solvent loss percentage decreases from about 0.85% to about 0.4% as the solvent-fuel ratio increases from 0.5 to 3. For the simulation model at 130° C. separator operation temperature, the solvent loss percentage decreases from about 0.45% to about 0.1% as the solvent-fuel ratio increases from 0.5 to 3.

Graph 405 illustrates a net heat required (in kJ per hour) vs. ratio of solvent to fuel for the two simulation cases (for example, separator operation at 130° C. and separator operation at 170° C.). As illustrated, generally, as the ratio of solvent to fuel increases, more heat input is needed into the system (for example, system 300), such as into the solvent-extract stream, the fluid solvent fuel stream, the separator, or other portion of the system. This heat can be obtained, for example, from one or more heat exchangers (for example, heat exchangers 318 and 328) or other sources of heat. For the simulation model at 170° C. separator operation temperature, the net heat required increases from about 600 kJ/hr to about 2500 kJ/hr as the solvent-fuel ratio increases from 0.5 to 3. For the simulation model at 130° C. separator operation temperature, the net heat required increases from about 375 kJ/hr to about 1500 kJ/hr as the solvent-fuel ratio increases from 0.5 to 3.

Graph 410 illustrates a RON of a high RON fractional component stream vs. ratio of solvent to fuel for the two simulation cases (for example, separator operation at 130° C. and separator operation at 170° C.). In graph 410, the high RON fractional component stream may represent the second fractional component stream (for example, the raffinate). Generally, the RON of the raffinate stream decreases as the solvent-fuel ratio increases. For the simulation model at 170° C. separator operation temperature, the RON decreases from about 110 to about 106 as the solvent-fuel ratio increases from 0.5 to 3. For the simulation model at 130° C. separator operation temperature, the RON decreases from about 105.7 to about 102 as the solvent-fuel ratio increases from 0.5 to 3.

Graph 415 illustrates a RON of a low RON fractional component stream vs. ratio of solvent to fuel for the two simulation cases (for example, separator operation at 130° C. and separator operation at 170° C.). In graph 415, the low RON fractional component stream may represent the first fractional component stream (for example, the extract). Generally, the RON of the extract stream decreases as the solvent-fuel ratio increases. For the simulation model at 170° C. separator operation temperature, the RON decreases from about 90.5 to about 84 as the solvent-fuel ratio increases from 0.5 to 3. For the simulation model at 130° C. separator operation temperature, the RON decreases from about 91.8 to about 90 as the solvent-fuel ratio increases from 0.5 to 3.

Graph 420 illustrates a flow rate (in liters per hour) of a high RON fractional component stream vs. ratio of solvent to fuel for the two simulation cases (for example, separator operation at 130° C. and separator operation at 170° C.). In graph 420, the high RON fractional component stream may represent the second fractional component stream (for example, the raffinate). Generally, the flow rate of the raffinate stream increases as the solvent-fuel ratio increases. For the simulation model at 170° C. separator operation temperature, the flow rate of the raffinate increases from about 1 l/hr to about 3.5 l/hr as the solvent-fuel ratio increases from 0.5 to 3. For the simulation model at 130° C. separator operation temperature, the flow rate of the raffinate increases from about 0.5 l/hr to about 2.5 l/hr as the solvent-fuel ratio increases from 0.5 to 3.

Figure 5:
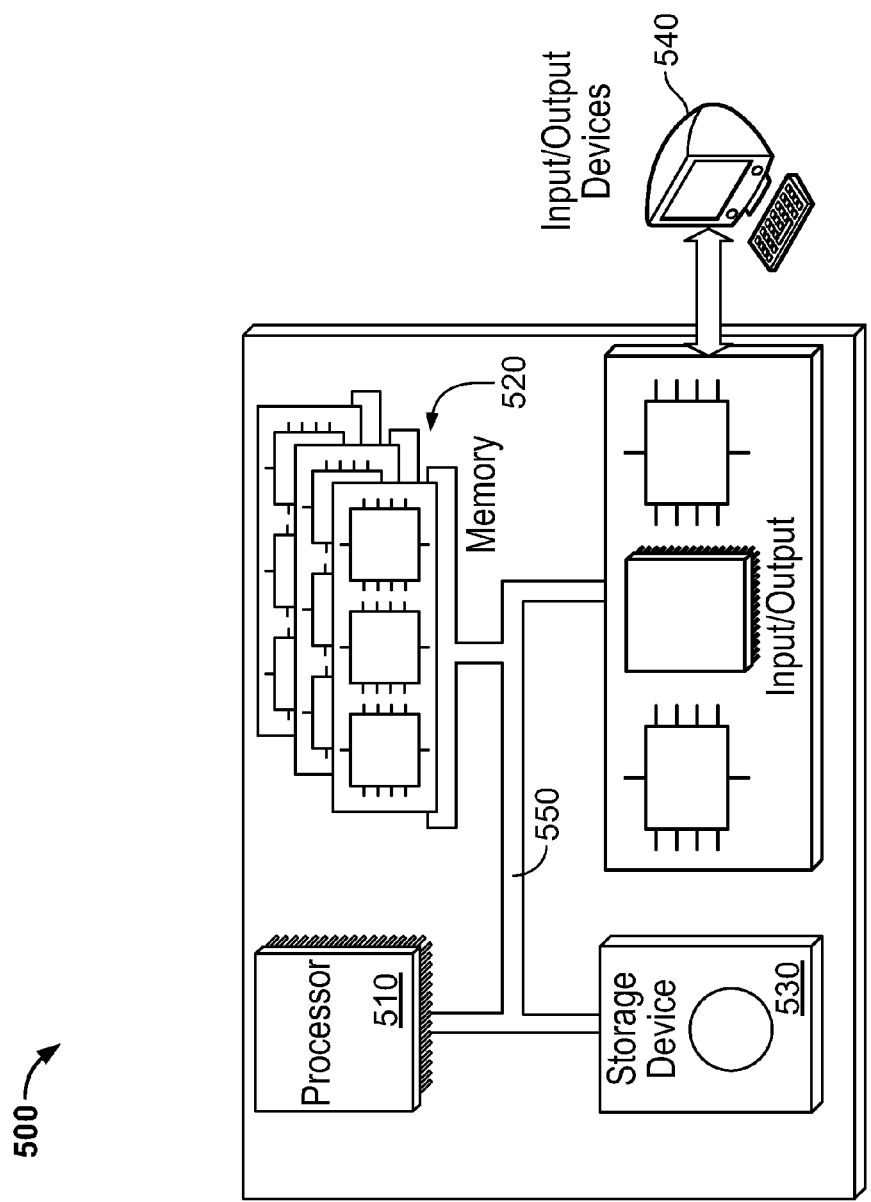
FIG. 5 is a schematic illustration of an example controller for an on-board fuel separation system according to the present disclosure.

FIG. 5 is a schematic illustration of an example controller 500 (or control system) for an on-board fuel separation system. For example, the controller 500 can be used for the operations described previously, for example as or as part of the control systems 218, 330, 380 or other controllers described herein. For example, the controller 500 may be communicably coupled with, or as a part of, one or both of a vehicle engine and on-board fuel separation system as described herein.

The controller 500 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, or a tape device.

The input/output device 540 provides input/output operations for the controller 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for separating a fuel on-board a vehicle, comprising:
    mixing, in an on-board fuel separation assembly of a vehicle, an input fuel stream and a fluid solvent;
    separating the mixture of the input fuel stream and the fluid solvent into a first liquid fuel stream and a second liquid fuel stream, the first liquid fuel stream comprising a first portion of the input fuel stream defined by a first auto-ignition characteristic value and the fluid solvent, the second liquid fuel stream comprising a second portion of the input fuel stream defined by a second auto-ignition characteristic value that is different than the first auto-ignition characteristic value;
    separating the first liquid fuel stream into the fluid solvent and the first portion of the input fuel stream;
    directing the first liquid fuel stream and the first portion of the input fuel stream through a first heat exchanger of the on-board fuel separation assembly;
    heating the first liquid fuel stream in the first heat exchanger with heat from a flow of the fluid solvent separated from the first portion of the input fuel stream;
    directing the heated first liquid fuel stream from the first heat exchanger to a second heat exchanger of the on-board fuel separation assembly;
    heating the heated first liquid fuel stream in the second heat exchanger with heat from the first portion of the input fuel stream;
    directing the heated first liquid fuel stream from the second heat exchanger to a third heat exchanger of the on-board fuel separation assembly;
    heating the heated first liquid fuel stream in the third heat exchanger with heat from an engine exhaust stream;
    directing the heated first liquid fuel stream to be separated into the fluid solvent and the first portion of the input fuel stream;
    directing the first portion of the input fuel stream to a first fuel tank on the vehicle; and
    directing the second portion of the input fuel stream to a second fuel tank on the vehicle.

2. The method of claim 1, wherein the input fuel stream comprises at least one of an aromatics portion or an oxygenates portion.

3. The method of claim 2, wherein separating the mixture of the input fuel stream and the fluid solvent into the first liquid fuel stream and the second liquid fuel stream comprises separating the first portion of the input fuel stream and the fluid solvent into the first liquid fuel stream based on a degree of affinity between at least one of the aromatics portion or the oxygenates portion and the fluid solvent.

4. The method of claim 2, wherein the fluid solvent comprises a first solvent portion comprising at least one of: dimethyl sulfoxide, sulfolane, propylene carbonate, ethylene glycol, diethylene glycol, triethylene glycol, tetraethylene glycol, N-formylmorpholine, furan, tetrahydrofuran, pyrrolidine, pyrrole, or thiophene, and
    separating the mixture of the input fuel stream and the fluid solvent into the first liquid fuel stream comprises separating the aromatics portion of the input fuel stream into the first liquid fuel stream and the second liquid fuel stream with the first solvent portion.

5. The method of claim 4, wherein the fluid solvent comprises a second solvent portion comprising at least one of: amyl acetate, benzyl alcohol, methyl isobutyl ketone, or water, and separating the mixture of the input fuel stream and the fluid solvent into the first liquid fuel stream comprises separating the oxygenates portion of the input fuel stream into the first liquid fuel stream and the second liquid fuel stream with the second solvent portion.

6. The method of claim 1, wherein mixing the input fuel stream and the fluid solvent comprises mixing the input fuel stream and the fluid solvent in a liquid-liquid extractor of the on-board fuel separation assembly.

7. The method of claim 6, wherein separating the mixture of the input fuel stream and the fluid solvent into the first liquid fuel stream and the second liquid fuel stream comprises separating the mixture of the input fuel stream and the fluid solvent into the first liquid fuel stream and the second liquid fuel stream in the liquid-liquid extractor.

8. The method of claim 6, further comprising:
determining a flow rate of the fluid solvent separated from the first liquid fuel stream;
determining a decrease in the flow rate of the separated fluid solvent;
based on the determined decrease being greater than a threshold value, directing fluid solvent from an on-board fluid solvent storage tank to the liquid-liquid extractor.

9. The method of claim 1, wherein separating the fluid solvent from the first liquid fuel stream comprises separating the fluid solvent from the first liquid fuel stream based on a difference in respective boiling points of the fluid solvent and the first liquid fuel stream.

10. The method of claim 9, wherein separating the fluid solvent from the first liquid fuel stream based on the difference in respective boiling points of the fluid solvent and the first liquid fuel stream comprises separating the fluid solvent from the first liquid fuel stream in a flash tank or a distillation unit of the on-board fuel assembly.

11. The method of claim 1, wherein the first auto-ignition characteristic value comprises a first octane number (ON) or a first cetane number, and the second auto-ignition characteristic value comprises a second ON or a second cetane number.

12. An on-board fuel separation system, comprising:
a liquid-liquid extraction unit configured to separate a mixture of an input fuel stream and a fluid solvent into a first liquid fuel stream and a second liquid fuel stream, the first liquid fuel stream comprising a first portion of the input fuel stream defined by a first auto-ignition characteristic value and the fluid solvent, the second liquid fuel stream comprising a second portion of the input fuel stream defined by a second auto-ignition characteristic value that is different than the first auto-ignition characteristic value;
a separator fluidly coupled to the liquid-liquid extraction unit and configured to receive the first liquid fuel stream and separate the first liquid fuel stream into the fluid solvent and the first portion of the input fuel stream;
a first heat exchanger positioned to receive the first liquid fuel stream from the liquid-liquid extraction unit and heat the first liquid fuel stream with the fluid solvent from the separator;
a second heat-exchanger positioned to receive the first liquid fuel stream from the first heat exchanger and heat the first liquid fuel stream with the first portion of the input fuel stream from the separator;

a third heat exchanger positioned to receive the first liquid fuel stream from the second heat exchanger and heat the first liquid fuel stream with an engine exhaust stream;
a first fuel tank fluidly coupled to receive the first portion of the input fuel stream from the separator; and
a second fuel tank fluidly coupled to receive the second portion of the input fuel stream from the liquid-liquid extraction unit.

13. The on-board fuel separation system of claim 12, wherein the input fuel stream comprises at least one of an aromatics portion or an oxygenates portion.

14. The on-board fuel separation system of claim 13, wherein
the fluid solvent comprises a first solvent portion comprising at least one of: dimethyl sulfoxide, sulfolane, propylene carbonate, ethylene glycol, diethylene glycol, triethylene glycol, tetraethylene glycol, N-formylmorpholine, furan, tetrahydrofuran, pyrrolidine, pyrrole, or thiophene, and the liquid-liquid-extraction unit is further configured to separate the aromatics portion of the input fuel stream into the first liquid fuel stream with the first solvent portion, and
the fluid solvent comprises a second solvent portion comprising at least one of: amyl acetate, benzyl alcohol, methyl isobutyl ketone, or water, and the liquid-liquid-extraction unit is further configured to separate the oxygenates portion of the input fuel stream into the first liquid fuel stream with the second solvent portion.

15. The on-board fuel separation system of claim 13, wherein the liquid-liquid extraction unit is configured to separate the first portion of the input fuel stream and the fluid solvent into the first liquid fuel stream based on a degree of affinity between at least one of the aromatics portion or the oxygenates portion and the fluid solvent.

16. The on-board fuel separation system of claim 12, wherein the separator comprises a flash tank or a distillation unit configured to separate the fluid solvent from the first liquid fuel stream based on a difference in respective boiling points of the fluid solvent and the first liquid fuel stream.

17. The on-board fuel separation system of claim 12, wherein the first auto-ignition characteristic value comprises a first octane number (ON) or a first cetane number, and the second auto-ignition characteristic value comprises a second ON or a second cetane number.

18. A vehicle system, comprising
a vehicle;
a fuel-powered internal combustion engine mounted in the vehicle;
an on-board fuel separation system, comprising:
a liquid-liquid extraction unit configured to separate a mixture of an input fuel stream and a fluid solvent into a first liquid fuel stream and a second liquid fuel stream, the first liquid fuel stream comprising a first portion of the input fuel stream defined by a first auto-ignition characteristic value and the fluid solvent, the second liquid fuel stream comprising a second portion of the input fuel stream defined by a second auto-ignition characteristic value that is different than the first auto-ignition characteristic value;
a separator fluidly coupled to the liquid-liquid extraction unit and configured to receive the first liquid fuel stream and separate the first liquid fuel stream into the fluid solvent and the first portion of the input fuel stream;
a first heat exchanger positioned to receive the first liquid fuel stream from the liquid-liquid extraction unit and heat the first liquid fuel stream with the fluid solvent from the separator;
a second heat-exchanger positioned to receive the separated fluid solvent from the first heat exchanger and heat the first liquid fuel stream with the first portion of the input fuel stream from the separator; and
a third heat exchanger positioned to receive the first liquid fuel stream from the second heat exchanger and heat the first liquid fuel stream with an engine exhaust stream;
a first fuel tank fluidly coupled between the engine and the separator to store the first portion of the input fuel stream from the separator; and
a second fuel tank fluidly coupled between the engine and the liquid-liquid extraction unit to store the second portion of the input fuel stream from the liquid-liquid extraction unit.

19. The vehicle system of claim 18, wherein the input fuel stream comprises at least one of an aromatics portion or an oxygenates portion, and
the fluid solvent comprises a first solvent portion comprising at least one of: dimethyl sulfoxide, sulfolane, propylene carbonate, ethylene glycol, diethylene glycol, triethylene glycol, tetraethylene glycol, N-formylmorpholine, furan, tetrahydrofuran, pyrrolidine, pyrrole, or thiophene, and the liquid-liquid-extraction unit is further configured to separate the aromatics portion of the input fuel stream into the first liquid fuel stream with the first solvent portion, and
the fluid solvent comprises a second solvent portion comprising at least one of: amyl acetate, benzyl alcohol, methyl isobutyl ketone, or water, and the liquid-liquid-extraction unit is further configured to separate the oxygenates portion of the input fuel stream into the first liquid fuel stream with the second solvent portion.

20. The vehicle system of claim 19, wherein the liquid-liquid extraction unit is configured to separate the first portion of the input fuel stream and the fluid solvent into the first liquid fuel stream based on a degree of affinity between at least one of the aromatics portion or the oxygenates portion and the fluid solvent.

21. The vehicle system of claim 18, wherein the separator comprises a flash tank or a distillation unit configured to separate the fluid solvent from the first liquid fuel stream based on a difference in respective boiling points of the fluid solvent and the first liquid fuel stream.

22. The vehicle system of claim 18, further comprising a make-up solvent system, comprising:
a make-up solvent tank configured to store a volume of the fluid solvent, the make-up solvent tank fluidly coupled to the liquid-liquid extraction unit; and
a control system communicably coupled to a fluid solvent regulator to control a circulation of the fluid solvent from the make-up solvent tank to the liquid-liquid extraction unit.

23. The vehicle system of claim 22, wherein the control system is configured to perform operations, comprising:
determining that a flow rate of the fluid solvent output from the separator is less than a threshold value; and
based on the determination, controlling the fluid solvent regulator to circulate fluid solvent from the make-up solvent tank to the liquid-liquid extraction unit.

24. The vehicle system of claim 18, wherein the first auto-ignition characteristic value comprises a first octane number (ON) or a first cetane number, and the second auto-ignition characteristic value comprises a second ON or a second cetane number.

* * * * *